US012706645B2

(12) United States Patent
Abebe et al.

(10) Patent No.: US 12,706,645 B2
(45) Date of Patent: Aug. 11, 2026

(54) METHOD AND APPARATUS FOR TRANSMITTING OR RECEIVING INFORMATION FOR ARTIFICIAL INTELLIGENCE BASED CHANNEL STATE INFORMATION FEEDBACK IN WIRELESS COMMUNICATION SYSTEM

(71) Applicant: SAMSUNG ELECTRONICS CO., LTD., Suwon-si (KR)

(72) Inventors: Ameha Tsegaye Abebe, Suwon-si (KR); Hyoungju Ji, Suwon-si (KR); Kyoungmin Park, Suwon-si (KR); Seongmok Lim, Suwon-si (KR); Yeongeun Lim, Suwon-si (KR); Youngrok Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 268 days.

(21) Appl. No.: 18/338,104

(22) Filed: Jun. 20, 2023

(65) Prior Publication Data

US 2023/0412227 A1 Dec. 21, 2023

(30) Foreign Application Priority Data

Jun. 20, 2022 (KR) ........................ 10-2022-0075021
Aug. 10, 2022 (KR) ........................ 10-2022-0100183

(51) Int. Cl.
*H04B 7/06* (2006.01)
*H04W 76/20* (2018.01)

(52) U.S. Cl.
CPC ......... *H04B 7/0626* (2013.01); *H04B 7/0658* (2013.01); *H04W 76/20* (2018.02)

(58) Field of Classification Search
CPC .... H04B 7/0626; H04B 7/0658; H04W 76/20
(Continued)

(56) References Cited

U.S. PATENT DOCUMENTS

2020/0220593 A1* 7/2020 Wen ........................ G06N 3/044
2021/0273706 A1 9/2021 Zeng et al.
(Continued)

FOREIGN PATENT DOCUMENTS

WO 2021159460 A1 8/2021
WO 2023102045 A1 6/2023
WO 2023171429 A1 9/2023

OTHER PUBLICATIONS

International Search Report and Written Opinion of the International Searching Authority dated Sep. 15, 2023, in connection with International Application No. PCT/KR2023/008556, 9 pages.
(Continued)

*Primary Examiner* — Candal Elpenord

(57) ABSTRACT

A method by which a user equipment (UE) including an encoder transmits or receives information for artificial intelligence (AI) based channel state information (CSI) feedback in a wireless communication system. The method may include receiving a CSI report configuration message from a base station (BS), generating compressed CSI feedback data through the encoder based on the CSI report configuration information and generating side information relating to the compressed CSI feedback data, and transmitting the compressed CSI feedback data and the side information to the BS.

13 Claims, 19 Drawing Sheets

(58) Field of Classification Search
USPC .................................................. 370/329–330
See application file for complete search history.

(56) References Cited

U.S. PATENT DOCUMENTS

| | | | | |
|---|---|---|---|---|
| 2021/0273707 | A1* | 9/2021 | Yoo | H04L 1/0045 |
| 2022/0149908 | A1 | 5/2022 | Gao et al. | |
| 2023/0040739 | A1* | 2/2023 | Song | H04B 7/0456 |
| 2023/0118031 | A1* | 4/2023 | Cai | H04B 7/0417 706/25 |
| 2023/0246693 | A1* | 8/2023 | Vitthaladevuni | H04L 1/0029 370/252 |
| 2023/0262728 | A1* | 8/2023 | Wu | G06N 20/00 |
| 2025/0038816 | A1 | 1/2025 | Beluri et al. | |
| 2025/0096982 | A1* | 3/2025 | Hang | H04B 7/0486 |
| 2025/0167859 | A1 | 5/2025 | Lin et al. | |
| 2025/0219693 | A1* | 7/2025 | Echigo | H04W 72/231 |
| 2025/0260449 | A1* | 8/2025 | Guan | H04B 7/0658 |

OTHER PUBLICATIONS

Moderator (Huawei), "Summary#5 of [109-e-R18-AI/ML-03]," R1-2205492, 3GPP TSG RAN WG1 Meeting #109-e, May 2022, 273 pages.

Fraunhofer IIS et al., "Discussion on the AI/ML methods for CSI feedback enhancements," R1-2204606, 3GPP TSG RAN WG1 Meeting #109-e, Apr. 2022, 5 pages.

Nokia at al., "Other aspects on AI/ML for CSI feedback enhancement," R1-2204572, 3GPP TSG RAN WG1 Meeting #109-e, Apr. 2022, 13 pages.

Supplementary European Search Report dated Sep. 8, 2025, in connection with European Patent Application No. 23827499.7, 12 pages.

Ericsson, "Discussions on AI-CSI," 3GPP TSG-RAN WG1 Meeting #109-e, Tdoc R1-2203282, Online, May 2022, 11 pages.

* cited by examiner

12T12R MIMO ANTENNA CONFIGURATION HAVING 2V3H AND 48 ANTENNA ELEMENTS

FIG. 6

601 CANDIDATE DFT BASIS VECTORS $\mathbf{W}_1$

602 SELECTED DFT BASIS VECTORS $\mathbf{b}_1$ $\mathbf{b}_0$ $\mathbf{b}_2$ $\mathbf{b}_3$ $\mathbf{W}_2$

603

$p_1$ $p_0$ $p_2$ $p_3$

604

$\begin{bmatrix} \varphi_0 & \varphi_1 & \varphi_2 & \varphi_3 \end{bmatrix}$ $$\mathbf{b} = \sum_{i=0}^{L-1} \mathbf{e}^{2\pi\varphi_i} p_i \mathbf{b}_i$$

SELECT DFT BASIS VECTOR

AMPLITUDE SCALING AND PHASING

COMMON PHASING AND LINEAR COMBINATION

METHOD AND APPARATUS FOR TRANSMITTING OR RECEIVING INFORMATION FOR ARTIFICIAL INTELLIGENCE BASED CHANNEL STATE INFORMATION FEEDBACK IN WIRELESS COMMUNICATION SYSTEM

CROSS-REFERENCE TO RELATED APPLICATIONS

This application is based on and claims priority under 35 U.S.C. § 119 to Korean Patent Application Nos. 10-2022-0075021 and 10-2022-0100183, filed on Jun. 20, 2022 and Aug. 10, 2022, respectively, in the Korean Intellectual Property Office, the disclosures of which are incorporated by reference herein in their entireties.

BACKGROUND

1. Field

The disclosure relates to a wireless communication system, and more particularly, to a method and apparatus for transmitting or receiving side information for artificial intelligence (AI) based channel state information (CSI) feedback in a multiple-input multiple-output (MIMO) system.

2. Description of the Related Art

Looking back through successive generations at a process of development of radio communication, technologies for human-targeted services such as voice, multimedia, data or the like have been developed. Connected devices that have been explosively increasing after the commercialization of fifth-generation (5G) communication systems are expected to be connected to communication networks. As examples of things connected to networks, there may be cars, robots, drones, home appliances, displays, smart sensors installed in various infrastructures, construction machinery, factory equipment, etc. Mobile devices are expected to evolve into various form factors such as augmentation reality (AR) glasses, virtual reality (VR) headsets, hologram devices, and the like. In order to provide various services by connecting hundreds of billions of devices and things in the sixth-generation (6G) era, there are ongoing efforts to develop better 6G communication systems. For these reasons, 6G communication systems are referred to as beyond-5G systems.

In the 6G communication system expected to become a reality by around 2030, a maximum transfer rate is tera bits per second (bps), i.e., 1000 giga bps, and a maximum wireless delay is 100 micro seconds (μsec). In other words, compared to the 5G communication system, the transfer rate becomes 50 times faster and the wireless delay is reduced to a tenth (1/10) in the 6G communication system.

To attain these high data transfer rates and ultra-low delay, the 6G communication system is considered to be implemented in the terahertz (THz) band (e.g., ranging from 95 gigahertz (GHz) to 3 THz). Due to the more severe path loss and atmospheric absorption phenomenon in the THz band as compared to the millimeter wave (mmWave) band introduced in 5G systems, importance of technology for securing a signal range, i.e., coverage, is expected to grow. As major technologies for securing coverage, radio frequency (RF) elements, antennas, new waveforms superior to orthogonal frequency division multiplexing (OFDM) in terms of coverage, beamforming and massive multiple-input and multiple-output (massive MIMO), full dimensional MIMO (FFD-MIMO), array antennas, multiple antenna transmission technologies such as large scale antennas, etc., need to be developed. Besides, new technologies for increasing coverage of THz band signals, such as metamaterial based lenses and antennas, a high-dimensional spatial multiplexing technique using orbital angular momentum (OAM), reconfigurable intelligent surface (RIS), etc., are being discussed.

Furthermore, in order to enhance frequency efficiency and system networks, a full duplex technology by which both uplink and downlink transmissions use the same frequency resource at the same time, a network technology that comprehensively uses satellite and high-altitude platform stations (HAPS) and the like, a network structure innovation technology supporting mobile base stations and allowing optimization and automation of network operation, a dynamic spectrum sharing technology through collision avoidance based on spectrum usage prediction, an artificial intelligence (AI) based communication technology to realize system optimization by using AI from the designing stage and internalizing an end-to-end AI supporting function, and a next generation distributed computing technology to realize services having complexity beyond the limit of terminal computing capability by using ultrahigh performance communication and computing resources (e.g., mobile edge computing (MEC) cloud) are being developed in the 6G communication system. In addition, by designing new protocols to be used in 6G communication systems, developing mechanisms for implementing a hardware-based security environment and safe use of data, and developing technologies for protecting privacy, attempts to strengthen connectivity between devices, further optimize the network, promote softwarization of network entities, and increase the openness of wireless communication are continuing.

With such research and development of the 6G communication system, it is expected that new levels of the next hyper-connected experience will become possible through hyper-connectivity of the 6G communication system including not only connections between things but also connections between humans and things. Specifically, it is predicted that services such as truly immersive extended reality (truly immersive XR), high-fidelity mobile hologram, digital replica, etc., may be provided. Furthermore, services such as remote surgery, industrial automation and emergency response with enhanced security and reliability may be provided through the 6G communication system to be applied in various areas such as industry, medical care, vehicles, appliances, etc.

SUMMARY

An embodiment of the disclosure provides a technology for a user equipment (UE) to reduce overhead of channel state information (CSI) feedback by transmitting side information to abase station (BS) and for the BS to increase accuracy in reconstructing compressed CSI data.

Technical objectives of the disclosure are not limited thereto, and other technical objectives may be inferred from the following embodiments of the disclosure.

Additional aspects will be set forth in part in the description which follows and, in part, will be apparent from the description, or may be learned by practice of the presented embodiments of the disclosure.

According to an aspect of the disclosure, a method by which a UE including an encoder transmits or receives information for artificial intelligence (AI) based CSI feedback in a wireless communication system includes receiving CSI report configuration information from a base station (BS), generating compressed CSI feedback data through the encoder based on the CSI report configuration information and generating side information relating to the compressed CSI feedback data, and transmitting the compressed CSI feedback data and the side information to the BS.

According to an aspect of the disclosure, a UE for transmitting or receiving information for AI based CSI feedback in a wireless communication system includes an encoder, a transceiver and at least one processor. The at least one processor may be configured to receive a CSI report configuration information from a BS through the transceiver, generate compressed CSI feedback data through the encoder based on the CSI report configuration information, generate side information relating to the compressed CSI feedback data, and transmit the compressed CSI feedback data and the side information to the BS through the transceiver.

According to an aspect of the disclosure, a method by which a BS including a decoder and a post-processor transmits or receives information for AI based CSI feedback in a wireless communication system includes transmitting CSI report configuration information to a UE, receiving, from the UE, compressed CSI feedback data determined based on the CSI report configuration information and side information relating to the compressed CSI feedback data, reconstructing the compressed CSI feedback data through the decoder, and post-processing the reconstructed CSI feedback data through the post-processor based on the side information.

According to an aspect of the disclosure, a BS for transmitting or receiving information for AI based CSI feedback in a wireless communication system includes a decoder, a post-processor, a transceiver and at least one processor. The at least one processor may be configured to transmit CSI report configuration information to a UE through the transceiver, receive compressed CSI feedback data determined based on the CSI report configuration information and side information relating to the compressed CSI feedback data from the UE through the transceiver, reconstruct the compressed CSI feedback data through the decoder, and post-process the reconstructed CSI feedback data through the post-processor based on the side information.

According to an embodiment of the disclosure, provided is a computer-readable recording medium storing a program for executing a method in at least one of the embodiments of the disclosure, on a computer.

Before undertaking the DETAILED DESCRIPTION below, it may be advantageous to set forth definitions of certain words and phrases used throughout this patent document: the terms “include” and “comprise,” as well as derivatives thereof, mean inclusion without limitation; the term “or,” is inclusive, meaning and/or; the phrases “associated with” and “associated therewith,” as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term “controller” means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms “application” and “program” refer to one or more computer programs, software components, sets of instructions, procedures, functions, objects, classes, instances, related data, or a portion thereof adapted for implementation in a suitable computer readable program code. The phrase “computer readable program code” includes any type of computer code, including source code, object code, and executable code. The phrase “computer readable medium” includes any type of medium capable of being accessed by a computer, such as read only memory (ROM), random access memory (RAM), a hard disk drive, a compact disc (CD), a digital video disc (DVD), or any other type of memory. A “non-transitory” computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6 illustrates a diagram for describing a pre-coder configuration in type II CSI, according to an embodiment of the disclosure;

DETAILED DESCRIPTION

Figure 1:
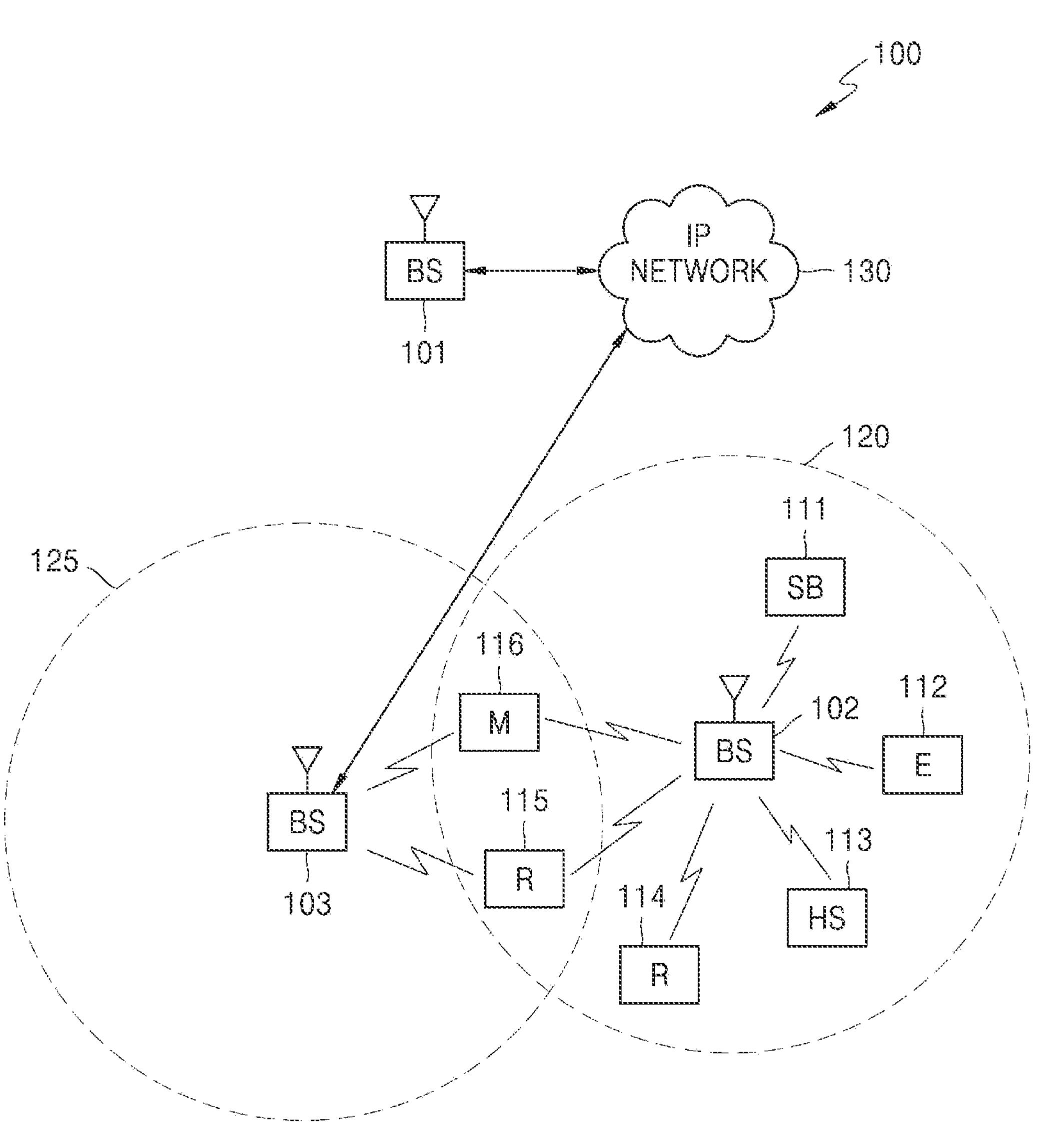
FIG. 1 illustrates a diagram for describing a communication network, according to an embodiment of the disclosure.

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the disclosure will now be described in detail with reference to accompanying drawings.

Description of technological content well-known in the art or not directly related to the disclosure will be omitted herein. Through the omission of the content that might otherwise obscure the subject matter of the disclosure, the subject matter will be understood more clearly. Further, the terms, as will be mentioned later, are defined by taking functionalities in the disclosure into account, but may vary depending on practices or intentions of users or operators. Accordingly, the terms should be defined based on descriptions throughout this specification.

For the same reason, some parts in the accompanying drawings are exaggerated, omitted or schematically illustrated. The size of the respective elements may not fully reflect their actual size. Like numbers refer to like elements throughout the drawings.

Advantages and features of the disclosure, and methods for achieving them will be understood more clearly when the following embodiments are read with reference to the accompanying drawings. The embodiments of the disclosure may, however, be embodied in many different forms and should not be construed as limited to the embodiments set forth herein; rather, these embodiments of the disclosure are provided so that this disclosure will be thorough and complete, and will fully convey the scope of the embodiments of the disclosure to those of ordinary skill in the art. Like numbers refer to like elements throughout the specification. In the description of the disclosure, when it is determined that a detailed description of related functions or configurations may unnecessarily obscure the subject matter of the disclosure, the detailed description will be omitted. Further, the terms, as will be mentioned later, are defined by taking functionalities in the disclosure into account, but may vary depending on practices or intentions of users or operators. Accordingly, the terms should be defined based on descriptions throughout this specification.

Throughout the disclosure, the expression "at least one of a, b or c" indicates only a, only b, only c, both a and b, both a and c, both b and c, all of a, b, and c, or variations thereof.

Throughout the specification, a layer may also be referred to as an entity.

A base station (BS) as herein used may refer to an entity for performing resource allocation for a user equipment (UE) and may be at least one of gNode B, eNode B, Node B (or xNode B, where x represents any letter including 'g' and 'e'), a radio access unit, a BS controller, a satellite, an airborne vehicle or a node in a network. A UE may include a mobile station (MS), a vehicle, a satellite, an airborne vehicle, a cellular phone, a smart phone, a computer, or a multimedia system having a communication function. In the disclosure, a downlink (DL) may refer to a radio transmission path for a signal transmitted from a BS to a UE, and an uplink (UL) may refer to a radio transmission path for a signal transmitted from a UE to a BS. In addition, there may be a sidelink (SL) that refers to a radio transmission path for a signal transmitted from a UE to another UE.

Although the following embodiments of the disclosure will be focused on the long-term evolution (LTE), LTE-Advanced (LTE-A) or a fifth generation (5G) system as an example, they may be applied to other communication systems with similar technical backgrounds or channel types. For example, the other communication systems may include a 5G-Advanced, new radio (NR)-Advanced or sixth generation (6G) mobile communication technology developed after the 5G mobile communication technology (or NR), and the term 5G may be a concept including the existing LTE, LTE-A and other similar services. Furthermore, embodiments of the disclosure will also be applied to different communication systems with some modifications to such an extent that does not significantly deviate the scope of the disclosure when judged by skilled people in the art.

Wireless communication is one of the most successful innovations in modern history. The number of wireless communication service subscribers exceeds 5 billion these days and continues to grow fast. As various mobile data devices such as smart phones, tablets, note pad computers, net books, e-book readers, etc., become popular among consumers and in the business world, demand for mobile data traffic is rising steeply. To meet the high growth of mobile data traffic and support distribution of new applications, it is important to enhance coverage and efficiency of a radio interface.

5G communication systems have been developed and distributed to meet the ever-increasing demand for wireless data traffic since distribution of fourth generation (4G) communication systems and enable various vertical application programs.

The 5G communication system has the 28 GHz or 60 GHz band or a high frequency band above 6 GHz (e.g., millimeter wave (mmwave) band) to attain high data rates, or enables robust coverage and mobility support in a low frequency band below 6 GHz. Embodiments of the disclosure may be applied to the 5G communication systems, 6G, or further, future releases that use Tera Hertz (THz) frequencies. To reduce the propagation loss of radio waves and increase the transmission range, beamforming, massive MIMO, full dimensional (FD) MIMO, array antenna, analog beamforming, and massive antenna technologies will be discussed in a wireless communication system according to an embodiment of the disclosure.

In the 5G communication system, small cells, a cloud radio access network (RAN), a ultra-dense network, device-to-device (D2D) communication, wireless backhaul, a mobile network, cooperative communication, coordinated multi-points (CoMP), interference cancellation at a receiving end, and the like are being developed for network enhancement of the system. In addition, in the 5G communication system, an advanced coding modulation (ACM) e.g., hybrid frequency shift keying (FSK) and Feher's quadrature amplitude modulation (FQAM), and sliding window superposition coding (SWSC), and an advanced access technology, e.g., filter bank multi carrier (FBMC), non-orthogonal multiple access (NOMA), and sparse code multiple access (SCMA) are being developed.

The Internet is a human-oriented connectivity network where humans generate and consume information, and is evolving to an Internet of things (IoT) where distributed entities or things exchange information between them and process the information. Internet of everything (IoE) which is a combination of the IoT technology and big data processing technology through connection with a cloud server has emerged. As technology elements such as sensing technology, wired/wireless communication and network infrastructure, service interface technology, and security technology have been demanded for IoT implementation, sensor networks, machine-to-machine (M2M) communication, machine type communication (MTC), and the like are being researched. The IoT environment may provide intelligent Internet technology (IT) services that create new values for human lives by collecting and analyzing data generated from connected things. IoT may be applied to a variety of areas, such as smart home, smart buildings, smart cities, smart cars or connected cars, smart grid, health care, smart home appliances and advanced medical services through convergence and combination between existing information technologies (IT) and various industrial applications.

The 5G communication system may be applied to the IoT network. For example, technologies such as a sensor network, MTC, and M2M communication may be implemented by beamforming, MIMO, and array antennas. Applying a cloud radio access network (RAN) as a big data processing technology may be an example of convergence between the 5G technology and the IoT technology.

It may be understood that respective blocks and combinations of the blocks in processing flowcharts will be performed by computer program instructions in an embodiment of the disclosure. The computer program instructions may be loaded on a processor of a universal computer, a special-purpose computer, or other programmable data processing equipment, and thus they generate means for performing functions described in the block(s) of the flowcharts when executed by the processor of the computer or other programmable data processing equipment. The computer program instructions may also be stored in computer-usable or computer-readable memories oriented for computers or other programmable data processing equipment, so it is possible to manufacture a product that contains instruction means for performing functions described in the block(s) of the flowchart. The computer program instructions may also be loaded on computers or programmable data processing equipment, so it is possible for the instructions to generate a process executed by the computer or the other programmable data processing equipment to provide steps for performing functions described in the block(s) of the flowchart.

Furthermore, each block may represent a part of a module, segment, or code including one or more executable instructions to perform particular logic function(s). It is noted that the functions described in the blocks may occur out of order in some alternative embodiments. For example, two successive blocks may be performed substantially at the same time or in reverse order depending on the corresponding functions. For example, a series of operations as illustrated may be various operations included in different drawings that may overlap each other, occur in parallel, occur in different order, or occur several times. Furthermore, in some examples, the operations may be omitted or replaced by other operations.

The term "module" (or sometimes "unit") as used herein refers to a software or hardware component, such as field programmable gate array (FPGA) or application specific integrated circuit (ASIC), which performs some functions. However, the module is not limited to software or hardware. The module may be configured to be stored in an addressable storage medium, or to execute one or more processors. For example, the modules may include components, such as software components, object-oriented software components, class components and task components, processes, functions, attributes, procedures, subroutines, segments of program codes, drivers, firmware, microcodes, circuits, data, databases, data structures, tables, arrays, and variables. Functions served by components and modules may be combined into a smaller number of components and modules, or further divided into a larger number of components and modules. Moreover, the components and modules may be implemented to execute one or more central processing units (CPUs) in a device or security multimedia card. In embodiments of the disclosure, the module may include one or more processors.

In the following description, the terms referring to broadcast information, control information, state changes (e.g., events), network entities, messages, and components of an apparatus, the terms related to communication coverage, etc., are mentioned for convenience of explanation. The disclosure is not limited to the terms as will be used in the following description, and may use different terms having the same meaning in a technological sense.

In the following description, for convenience of explanation, terms and definitions used in the most recent standards among the currently existing communication standards, i.e., in the LTE and NR standard defined in the 3rd Generation Partnership Project (3GPP) will be used in the disclosure. The disclosure is not, however, limited to the terms and definitions, and may be equally applied to any systems that conform to other standards.

In an embodiment of the disclosure, a method and apparatus for transmitting or receiving information for artificial intelligence (AI) based (or autoencoder (AE) based) channel state information (CSI) feedback may be provided in a wireless communication system (or communication network).

FIG. 1 illustrates a diagram for describing a communication network 100, according to an embodiment of the disclosure.

The communication network 100 shown in FIG. 1 is merely an example, and various embodiments of the communication network 100 which is not limited to FIG. 1 may be applied to the embodiment of the disclosure.

A wireless communication system or the communication network 100 according to an embodiment of the disclosure may include at least one of a 5G standalone network, a 5G non-standalone (NS) network or a 6G network.

Referring to FIG. 1, the communication network 100 may include a first BS, e.g., a gNB (or gNodeB), a second BS, and a third BS 103. The first BS 101 may communicate with the second BS 102 and the third BS 103. The first BS 101 may also communicate with at least one Internet protocol (IP) network 130, e.g., the Internet, a proprietary IP network, or another data network.

In an embodiment of the disclosure, based on the type of the communication network 100, the BS or gNB may refer to various components (or a collection of components) configured to provide remote UEs with radio access to the IP network 130, such as a base transceiver station, a wireless BS, a transmit point (TP), a transmit-receive point (TRP), a ground gateway, an airborne gNB, a satellite system, a mobile BS, a macrocell, a femtocell, a wireless fidelity (Wi-Fi) access point (AP), etc. Furthermore, based on the type of the communication network 100, various terms such as mobile station, subscriber station, remote UE, wireless UE or user device may be used instead of the term UE or user equipment. In the disclosure, for convenience of explanation, a device that wirelessly accesses a BS (or gNB) will now be denoted as a user equipment or a UE. The UE may be a mobile device or a stationary device. For example, the UE may be a cellphone, a smartphone, a monitoring device, an alarming device, a vehicle management device, an asset tracking device, a vehicle, a desktop computer, an entertainment device, an infotainment device, a vending machine, an electricity meter, a water meter, a gas meter, a security device, a sensor device, a home appliance, etc.

Referring to FIG. 1, the second BS 102 may provide wireless broadband access to the IP network 130 for a plurality of first UEs in a coverage area 120 of the second BS 102. The plurality of first UEs may include a UE 111 that may be located in a small business SB; a UE 112 that may be located in an enterprise E; a UE 113 that may be located in a Wi-Fi hotspot HS; a UE 114 that may be located in a first residence R; a UE 115 that may be located in a second residence R; and a mobile device M, e.g., a UE 116 that may be a cellphone, a wireless laptop, a wireless personal digital assistant (PDA), or the like. The third BS 103 may provide wireless broadband access to the IP network 130 for a plurality of second UEs in a coverage area 125 of the third BS 103. The plurality of second UEs may include a UE 115 and a UE 116. In some embodiments of the disclosure, the one or more BSs 101, 102 and 103 may use 5G, LTE, LTE-A, WiMAX or other wireless communication technologies to communicate with each other and communicate with at least one UE 111 to 116.

Referring to FIG. 1, dotted lines represent approximate ranges of the coverage areas 120 and 125, which are shown in circles for illustration and explanation. In an embodiment of the disclosure, the coverage areas of the BSs, e.g., the coverage area 120 of the second BS 102 and the coverage area 125 of the third BS 103 may have various forms including irregular forms depending on the configuration of each BS and a change in wireless environment associated with natural or artificial obstacles.

As will be described later in connection with FIG. 4, at least one of the first BS 101, the second BS 102 or the third BS 103 may include two-dimensional (2D) antenna arrays. In an embodiment of the disclosure, at least one of the first BS 101, the second BS 102 or the third BS 103 may support a codebook design and structure for systems having 2D antenna arrays.

FIG. 1 illustrates an example of the communication network 100, and various modifications may be made to FIG. 1. For example, the communication network 100 may include an arbitrary number of gNBs and an arbitrary number of UEs in various layouts. Furthermore, the first BS 101 may communicate directly with the arbitrary number of UEs and provide the UEs with wireless broadband access to the IP network 130. Likewise, the second BS 102 and the third BS 103 may also communicate directly with the IP network 130 and provide wireless broadband access to the IP network 130 for the connected UEs. In an embodiment of the disclosure, the first BS 101, the second BS 102 and the third BS 103 may also provide access to an additional external network or a different type of data network.

Figure 2A:
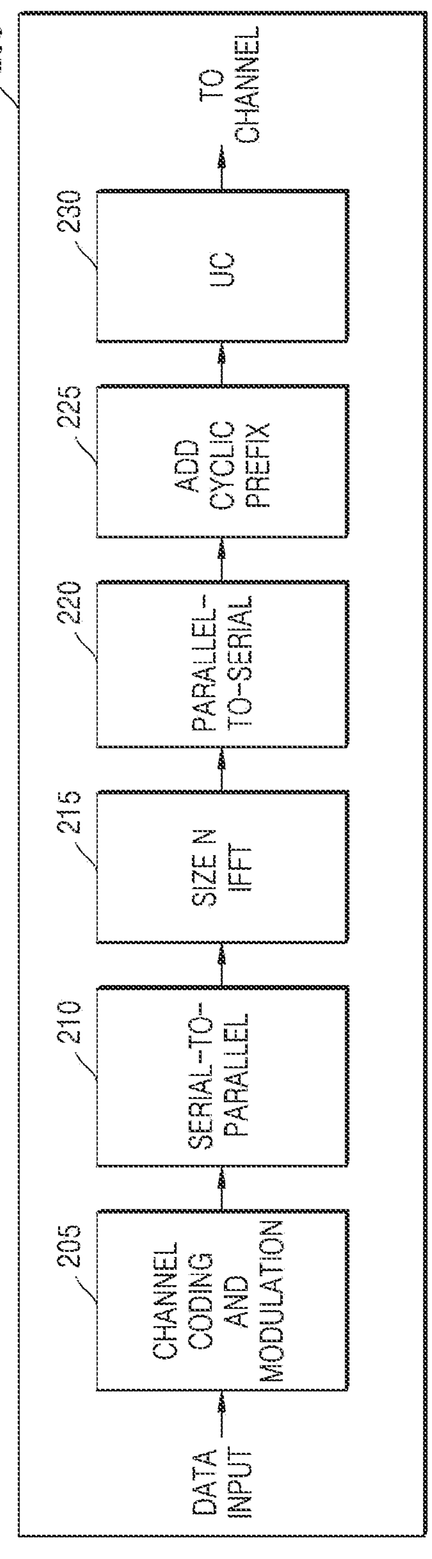
FIG. 2A illustrates a diagram for describing a data transmission path, according to an embodiment of the disclosure.
Figure 2B:
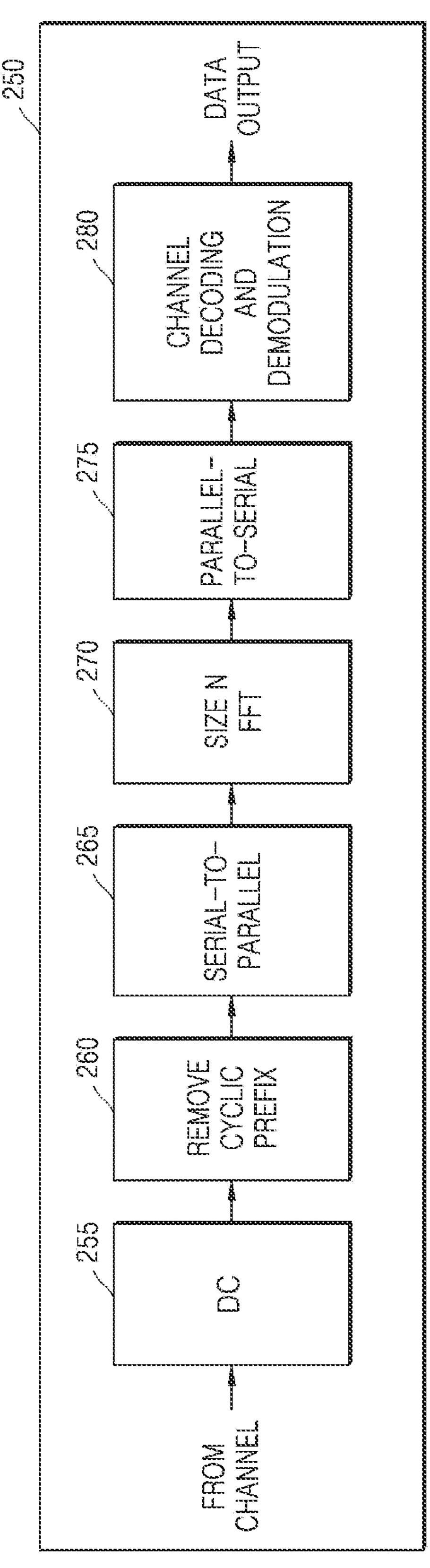
FIG. 2B illustrates a diagram for describing a data reception path, according to an embodiment of the disclosure.

FIG. 2A illustrates a diagram for describing a data transmission path 200, according to an embodiment of the disclosure, and FIG. 2B is a diagram for describing a data reception path 250, according to an embodiment of the disclosure.

In an embodiment of the disclosure, the data transmission path 200 may be implemented in a BS (e.g., the second BS 102 of FIG. 1), and the data reception path 250 may be implemented in a UE (e.g., the UE 116 of FIG. 1). In an embodiment, alternatively, the data reception path 250 may be implemented in the BS and the data transmission path 200 may be implemented in the UE. In an embodiment of the disclosure, the data reception path 250 may be configured to support a codebook design and structure for a system including a 2D antenna array as described above.

Referring to FIG. 2A, the data transmission path 200 may include a channel coding and modulation block 205, a serial-to-parallel (S-to-P) block 210, a size N inverse fast Fourier transform (IFFT) block 215, a parallel-to-serial (P-to-S) block 220, an add cyclic prefix block 225, and an up-converter (UC) 230.

Referring to FIG. 2B, the data reception path 250 may include a down-converter (DC) 255, a remove cyclic prefix block 260, a serial-to-parallel (S-to-P) block 265, a size N fast Fourier transform (FFT) block 270, a parallel-to-serial (P-to-S) block 275, and a channel decoding and demodulation block 280.

In the data transmission path 200, the channel coding and modulation block 205 may receive a set of information bits, apply coding (e.g., low-density parity check (LDPC) coding) and modulate (e.g., quadrature phase shift keying (QPSK) or quadrature amplitude modulation (QAM)) the input bits to produce a sequence of frequency domain modulation symbols. The S-to-P block 210 may convert (e.g., demultiplex) the serially modulated symbols to parallel data to produce N parallel symbol streams. N may be a size of the IFFT or FFT used by a BS (e.g., the second BS 102 of FIG. 1) and a UE (e.g., the UE 116 of FIG. 1). The size N IFFT block 215 may then perform an IFFT operation on the N parallel symbol streams to produce time domain output signals. The P-to-S block 220 may convert (e.g., multiplex) the serial time domain output symbols from the size N IFFT block 215 to produce a serial time domain signal. The add cyclic prefix block 225 may insert a cyclic prefix to the time domain signal. The UC 230 may convert an output of the add cyclic prefix block 225 into a radio frequency (RF) frequency (e.g., up conversion) for data transmission in a radio channel. In an embodiment of the disclosure, the signal may be filtered in a baseband before being converted into the RF frequency.

In an embodiment of the disclosure, when an RF signal transmitted from the BS arrives at the UE through the radio channel, the UE may perform the operations performed by the BS in reverse order. Referring to FIG. 2B, the DC 255 may down-convert the received signal into a baseband frequency, and the remove cyclic prefix block 260 may remove the cyclic prefix to produce a serial time domain baseband signal. The S-to-P block 265 may convert the time domain baseband signal to parallel time domain signals. The size N FFT block 270 may perform an FFT algorithm to produce N parallel frequency domain signals. The P-to-S block 275 may convert the parallel frequency domain signals to a sequence of modulated data symbols. The channel decoding and demodulation block 280 may demodulate and then decode the modulated symbols to recover the original input data stream.

The BS may implement the data transmission path 200 to the UE in a DL scenario and the data reception path 250 from UEs in a UL scenario. In a similar manner, the UEs may implement the data transmission path 200 to the BS in a UL scenario and the data reception path 250 from the BS in a DL scenario.

The respective blocks shown in FIG. 2A or 2B may be implemented in hardware or a combination of hardware and software or firmware. In an embodiment of the disclosure, at least some of the blocks in FIG. 2A or 2B may be implemented in software and the others may be implemented in hardware or a combination of hardware and software. For example, the FFT block 270 of FIG. 2B and the IFFT block 215 of FIG. 2A may be implemented in software algorithms, where the value of size N may be determined according to an embodiment of the disclosure.

Although the embodiment using the FFT and IFFT is described with reference to FIGS. 2A and 2B, it is merely an illustrative example and should not be construed as limiting the scope of the disclosure. In an embodiment of the disclosure, various types of transformation such as discrete Fourier transform (DFT) and inverse discrete Fourier transform (IDFT) functions may be used. For example, the variable N may have integer values (e.g., 1, 2, 3, 4, . . . ) for the DFT and IDFT functions, and may have values of powers of 2 (e.g., 1, 2, 4, 8, 16, . . . ) for the FFT and IFFT functions.

Although FIGS. 2A and 2B illustrate the wireless data transmission path 200 and data reception path 250, various modifications to FIGS. 2A and 2B may be made in an embodiment. For example, the various components of FIGS. 2A and 2B may be combined, subdivided or omitted, and additional components may be added at a particular request. Furthermore, FIGS. 2A and 2B are to describe illustrative types of data transmission path and data reception path to be used in the wireless communication network. Various suitable configurations to support wireless communication in a wireless network according to an embodiment of the disclosure may be used.

Figure 3A:
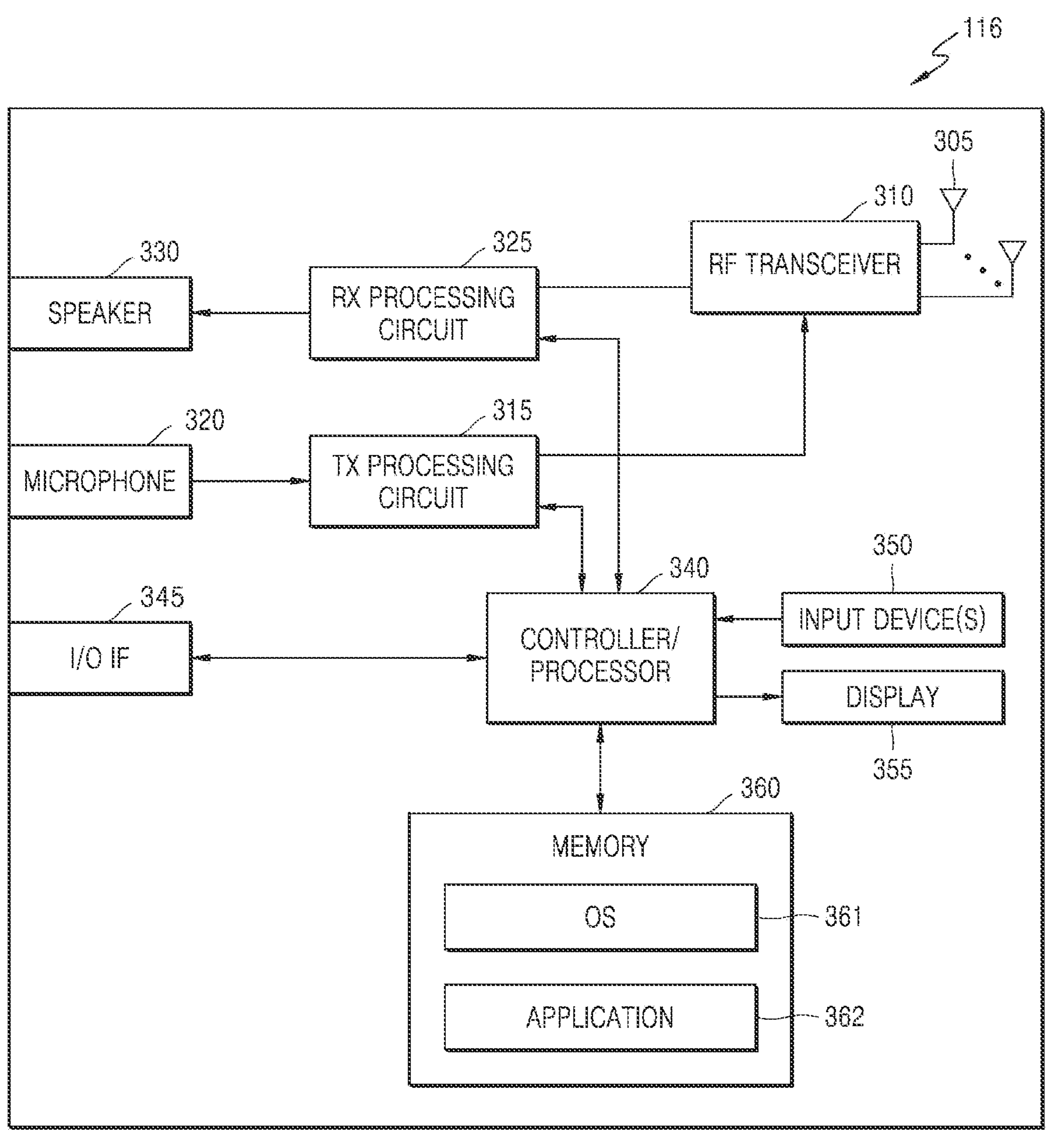
FIG. 3A illustrates a user equipment (UE), according to an embodiment of the disclosure.

FIG. 3A illustrates the UE 116, according to an embodiment of the disclosure.

The UE 116 of FIG. 3A may also be referred to as a terminal or user equipment. The UE 116 may correspond to at least one of the UEs 111 to 116 of FIG. 1. The UE according to an embodiment of the disclosure may be provided in various configurations, and is not limited to the UE 116 as shown in FIG. 3A.

Referring to FIG. 3A, the UE 116 may include at least one antenna 305, an RF transceiver 310, a transmit (TX) processing circuit 315, a microphone 320, and a receive (RX) processing circuit 325. The UE 116 may also include a speaker 330, a controller or processor 340, an input/output (I/O) interface (IF) 345, an input device 350 such as a keypad, a display 355, and a memory 360. The memory 360 may store a basic operating system (OS) program 361 and at least one application 362.

The RF transceiver 310 may receive, from the antenna 305, an incoming RF signal transmitted by a BS of a communication network. The RF transceiver 310 may down-convert the incoming RF signal to produce an intermediate frequency (IF) or a baseband signal. The IF or baseband signal may be transmitted to the RX processing circuit 325, which may in turn, generate a processed baseband signal by filtering, decoding, or digitizing the baseband or IF signal. The RX processing circuit 325 may transmit the processed baseband signal to the speaker 330 (for voice data) or the processor 340 for additional processing (on web browsing data).

The TX processing circuit 315 may receive analog or digital voice data from the microphone 320 or other outgoing baseband data (such as web data, e-mail, or interactive video game data) from the processor 340. The TX processing circuit 315 may encode, multiplex, or digitize the outgoing baseband data to produce a processed baseband or IF signal. The RF transceiver 310 may receive the outgoing processed baseband or IF signal from the TX processing circuit 315 and up-convert the baseband or IF signal to an RF signal to be transmitted via the antenna 305.

The processor 340 may include at least one processor or processing devices and execute the OS program 361 stored in the memory 360 in order to control the overall operation of the UE 116. For example, the processor 340 may control the reception of forward channel signals and the transmission of reverse channel signals by the RF transceiver 310, the RX processing circuit 325, and the TX processing circuit 315. In an embodiment of the disclosure, the processor 340 may include at least one microprocessor or microcontroller.

The processor 340 may execute a program stored in the memory 360 or another processor included in the memory 360 for an operation such as channel quality measurement and reporting about a system having a 2D antenna array. The processor 340 may move data into or out of the memory 360. In an embodiment of the disclosure, the processor 340 may run the applications 362 based on the OS program 361 or in response to a signal received from the BS. The processor 340 may be coupled to the I/O interface 345 that allows the UE 116 to access another device such as a laptop, a portable computer, or the like. The I/O interface 345 may be a communication path between various accessories and the processor 340.

The processor 340 may be coupled to the input device 350 or the display 355. The UE 116 may receive data through various input devices 350. The display 355 may include various types of display device such as a liquid crystal display (LCD) capable of rendering text or graphic from a website. The memory 360 may be coupled to the processor 340. The memory 360 may include at least one of a random-access memory (RAM), a flash memory, or a read-only memory (ROM).

The UE 116 as shown in FIG. 3A is merely an example, and various modifications from the configuration illustrated in FIG. 3A may be made to the UE 116. For example, various components shown in FIG. 3A may be combined, subdivided or omitted, and additional components may be added at a particular request. For example, the processor 340 included in the UE 116 may include a plurality of processors such as at least one central processing unit (CPU), at least one graphics processing unit (GPU), etc. The UE 116 shown in FIG. 3A may be implemented as a mobile phone or a smart phone, but it is not limited thereto and may be implemented as various types of mobile or stationary devices.

Figure 3B:
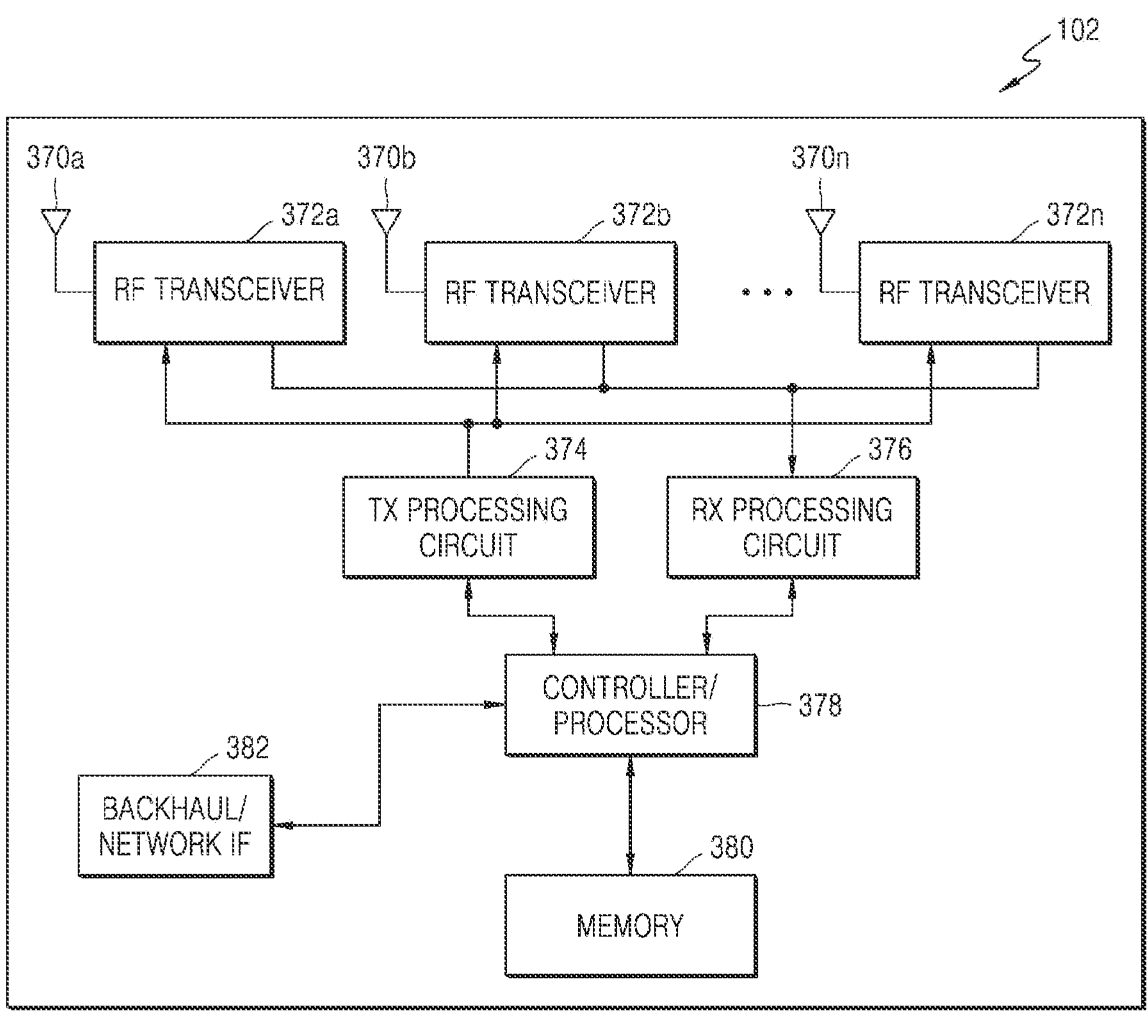
FIG. 3B illustrates a base station (BS), according to an embodiment of the disclosure.

FIG. 3B illustrates a BS 102, according to an embodiment of the disclosure.

The BS 102 of FIG. 3B may also be referred to as a gNB. The BS 102 may correspond to at least one of the first BS 101, the second BS 102 or the third BS 103 of FIG. 1. The UE according to an embodiment of the disclosure may be provided in various configurations, and is not limited to the BS 102 as shown in FIG. 3B.

Referring to FIG. 3B, the BS 102 may include at least one antenna 370*a*, 370*b*, . . . , and 370*n*, at least one RF transceiver 372*a*, 372*b*, . . . , and 372*n*, a TX processing circuit 374, and an RX processing circuit 376. In an embodiment of the disclosure, the at least one antenna 370*a*, 370*b*, . . . , and 370*n* may include a 2D antenna array. The BS 102 may also include a controller or processor 378, a memory 380, and a backhaul or network interface 382.

The at least one RF transceiver 372*a*, 372*b*, . . . , and 372*n* may receive an incoming RF signal such as a signal transmitted by the UE or another BS from the at least one antenna 370*a*, 370*b*, . . . , and 370*n*. The RF transceiver 372*a*, 372*b*, . . . , or 372*n* may down-convert the incoming RF signal to produce an IF or baseband signal. The IF or baseband signal may be transmitted to the RX processing circuit 376, which may in turn, generate processed baseband signals by filtering, decoding, or digitizing the baseband or IF signals. The RX processing circuit 376 may transmit the processed baseband signal to the processor 378 for further processing.

The TX processing circuit 374 may receive analog or digital data (such as voice data, web data, e-mail, or interactive video game data) from the processor 378. The TX processing circuit 374 may encode, multiplex, and/or digitize the outgoing baseband data to produce a processed baseband or IF signal. The RF transceiver 372*a*, 372*b*, . . . , or 372*n* may receive the outgoing processed baseband or IF signal from the TX processing circuit 374 and up-convert the baseband or IF signal to an RF signal that is transmitted through the antenna 370*a*, 370*b*, . . . , or 370*n*.

The processor 378 may include at least one processor or processing devices for controlling general operation of the BS 102. For example, the processor 378 may control the reception of forward channel signals and the transmission of reverse channel signals by the RF transceiver 372*a*, 372*b*, . . . , or 372*n*, the RX processing circuit 376, and the TX processing circuit 374. In an embodiment of the disclosure, the processor 378 may support an additional function such as an advanced wireless communication function. For example, the processor 378 may perform a blind interference sensing (BIS) process by using a BIS algorithm and decode the received signal offset by interference signals. Other various functions may be supported by the processor 378 in the BS 102. In an embodiment, the processor 378 may include at least one microprocessor or microcontroller.

The processor 378 may also execute a program stored in the memory 380 such as the OS or other operations. The processor 378 may support an operation such as channel quality measurement and reporting about systems having a 2D antenna array. In an embodiment of the disclosure, the processor 378 may support communication between network entities such as web real-time communication. The processor 378 may move data into or out of the memory 380.

The processor 378 may be coupled to the backhaul or network interface 382. The backhaul or network interface 382 may allow the BS 102 to communicate with other devices by backhaul connection or over a network. The backhaul or network interface 382 may support communication by various types of wired or wireless connection. For example, when the BS 102 is implemented as part of a wireless communication system (e.g., 5G, LTE, or LTE-A), the backhaul or network interface 382 may allow the BS 102 to communicate with another BS by wired or wireless backhaul connection. When the BS 102 is implemented as an access point (AP), the backhaul or network interface 382 may allow the BS 102 to perform communication over a wired or wireless local area network (LAN) or by wired or wireless connection to a larger network (e.g., the Internet). The backhaul or network interface 382 may include various configurations to support communications by wired or wireless connection such as Ethernet or the RF transceiver.

The memory 380 may be coupled to the processor 378. The memory 380 may include at least one of a RAM, a flash memory, or a ROM. In an embodiment of the disclosure, instructions such as the BIS algorithm may be stored in the memory 380. The instructions stored in the memory 380 may be configured for the processor 378 to perform a BIS process and decode the received signal after offsetting at least one interference signal determined by the BIS algorithm.

As will be described in detail, the data transmission path and data reception path of the BS 102 may support communication with the aggregation of frequency division duplex (FDD) cells and time division duplex (TDD) cells. The data transmission path and data reception path of the BS 102 may be implemented by the RF transceiver 372*a*, 372*b*, . . . , or 372*n*, the TX processing circuit 374, and the RX processing circuit 376.

The BS 102 as shown in FIG. 3B is merely an example, and various modifications from the configuration illustrated in FIG. 3B may be made to the BS 102. For example, the various components of FIG. 3B may be combined, subdivided or omitted, and additional components may be added at a particular request. For example, the BS 102 as an AP may include a plurality of backhaul or network interfaces 382, and the processor 378 may support a routing function to route data between different network addresses. Referring to FIG. 3B, each of the TX processing circuit 374 and the RX processing circuit 376 is shown as being configured as a single instance, but the BS 102 may include the TX processing circuit 374 and the RX processing circuit 376 each provided as a plurality of instances (e.g., one TX processing circuit 374 and one RX processing circuit 376 for each RF transceiver).

Figure 4:
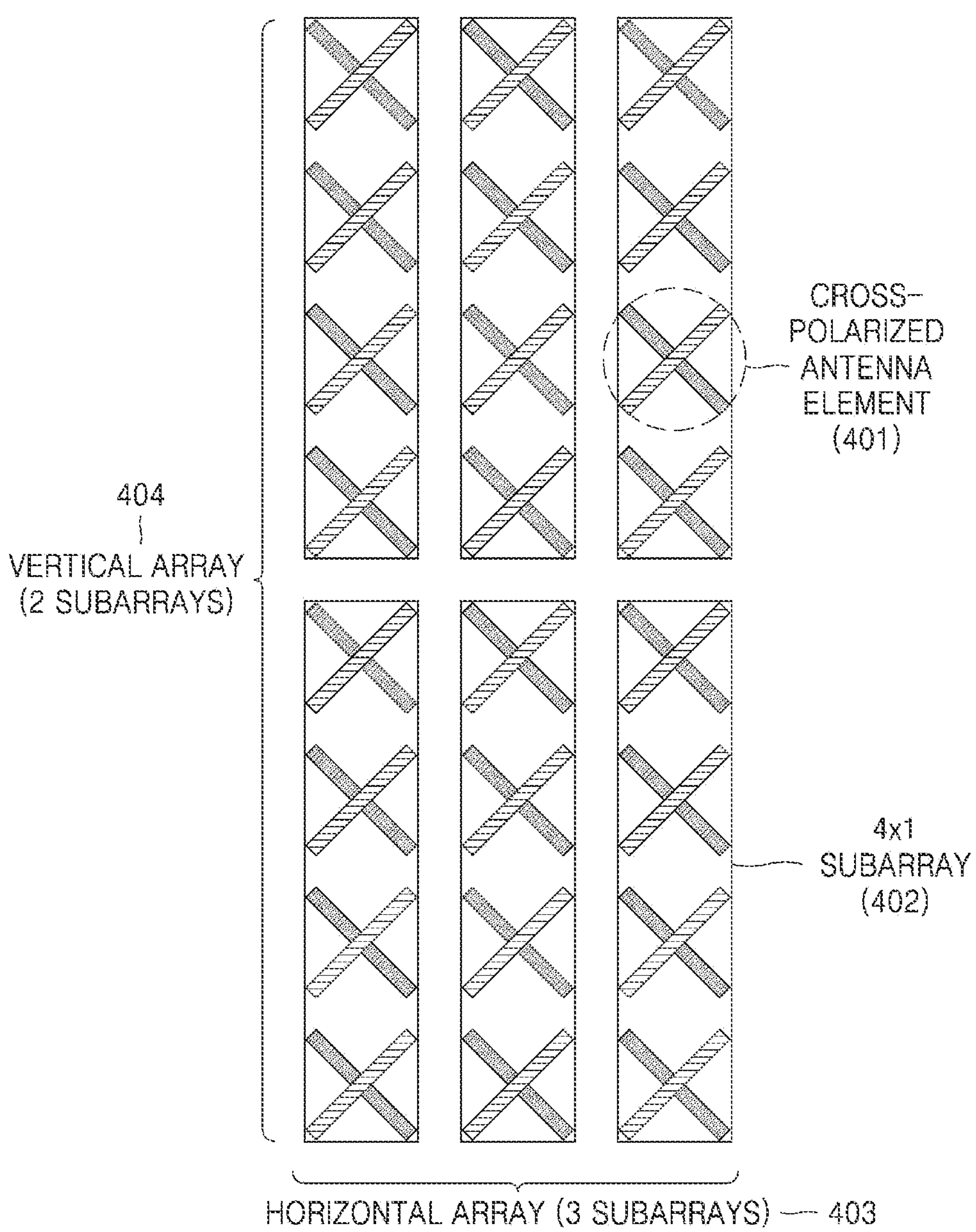
FIG. 4 illustrates a cross-polarized multiple input multiple output (MIMO) antenna system, according to an embodiment of the disclosure.

FIG. 4 illustrates a cross-polarized MIMO antenna system, according to an embodiment of the disclosure.

In a MIMO antenna system, a BS or a UE may each include a plurality of antennas. The MIMO antenna system may be employed by the wireless communication system because of advantages in spatial multiplexing, diversity gain and array gain.

Referring to FIG. 4, the MIMO antenna system may include e.g., 48 antenna elements. In FIG. 4, 4 cross-polarized antenna elements 401 may constitute a 4×1 sub-array 402. 12 sub-arrays 402 may constitute a 2V3H MIMO antenna configuration comprised of 2 sub-arrays 402 in the vertical dimension and 3 sub-arrays 402 in the horizontal dimension. FIG. 4 illustrates an example of a MIMO antenna configuration, and various configurations may be applied to the antenna configuration according to an embodiment of the disclosure.

In the MIMO antenna system, when the BS requests channel state information (CSI), the UE may receive signals from the BS at maximum possible receive power and minimum possible interference. The BS may obtain the CSI through measurement of a UL reference signal (RS) in the BS or measurement and feedback of a DL RS by the UE for the respective TDD system and FDD system. For example, in an FDD system of a 5G network, a CSI-RS may be a main RS used by the UE in operation of measuring and reporting the CSI.

Figure 5:
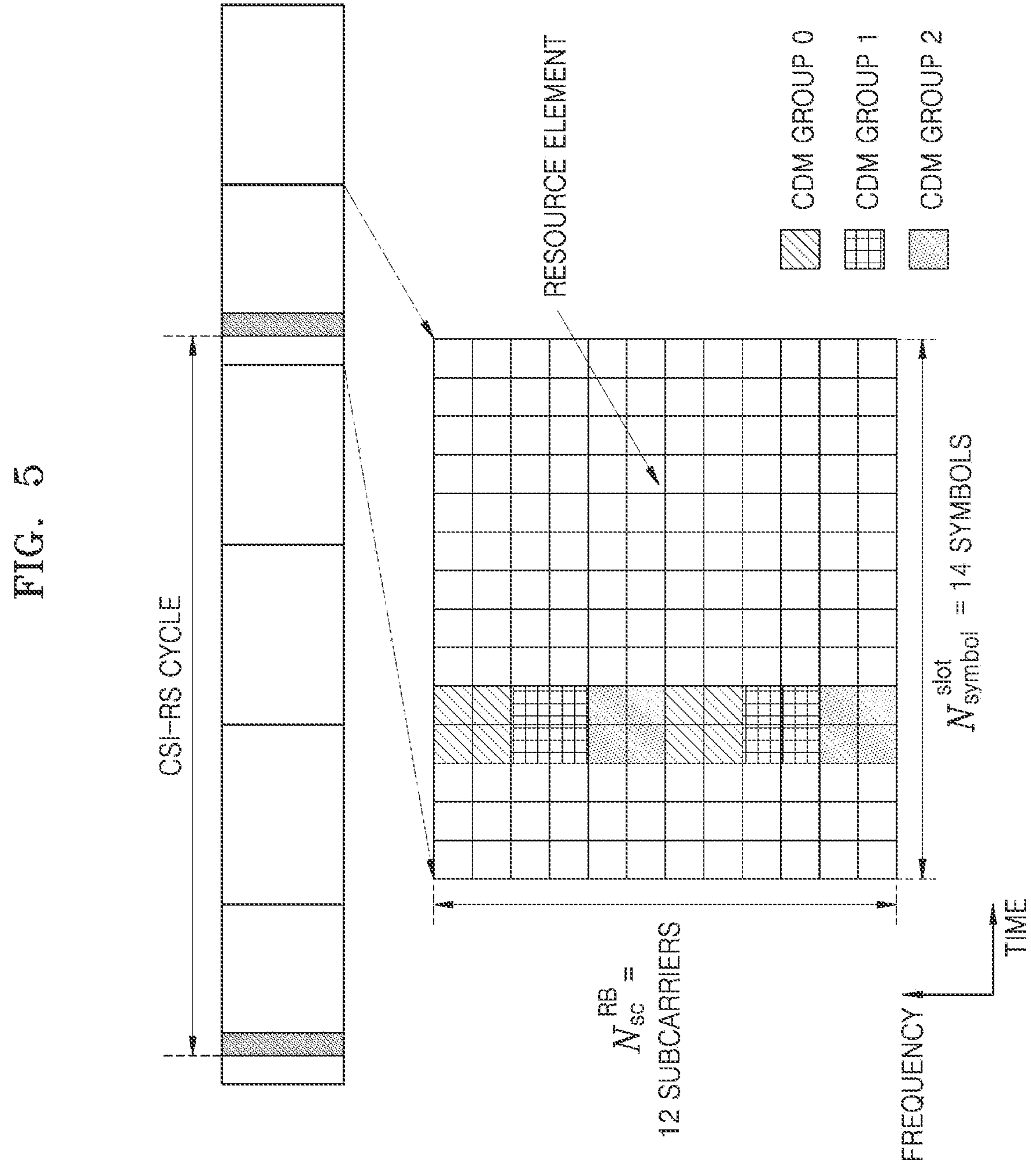
FIG. 5 illustrates a diagram for describing channel state information (CSI) reference signal (RS) (CSI-RS) resource mapping in an orthogonal frequency division multiple access (OFDM) time-frequency grid, according to an embodiment of the disclosure.

FIG. 5 illustrates a diagram for describing CSI-RS resource mapping in an orthogonal frequency division multiple access (OFDM) time-frequency grid, according to an embodiment of the disclosure.

In an embodiment, the UE may receive signaling of a configuration of a CSI-RS that may be used in CSI measurement from the BS. An embodiment of the configuration of a CSI-RS is shown in FIG. 5.

Referring to FIG. 5, 12 antenna ports (CSI-RS ports) may be mapped to a CSI-RS having three code domain multiplexing (CDM) groups. The CDM groups (CDM group 0, CDM group 1 and CDM group 2) may each be mapped to 4 resource elements (REs) in the OFDM time-frequency grid. Antenna ports mapped to the same CDM group may be orthogonalized in a code domain by using orthogonal cover codes.

Referring to FIG. 5, the CSI-RS configuration may be associated with the MIMO antenna configuration as shown in FIG. 4 by mapping the CSI-RS port to one of the cross-polarized antenna elements in a sub-array. In the 5G NR standard, there may be 3 time domain CSI-RS resource configurations, i.e., periodic, semi-persistent and aperiodic configurations. Referring to FIG. 5, periodic configurations having a period of 4 slots are illustrated.

In an embodiment of the disclosure, the BS may configure the UE by higher layer signaling by using information for CSI feedback including a spatial channel information indicator and other side information to assist the BS in obtaining accurate CSI. A spatial channel indicator to be reported in a precoding matrix indicator (PMI) in the 4G or 5G standard may include a single or multiple channel matrices, a channel covariance matrix, a eigenvector, or a spatial sampling basis vector. Especially, in the 4G or 5G standard, the spatial channel information may be given as a single or multiple DFT basis vectors.

FIG. 6 illustrates a diagram for describing a precoder configuration in type II CSI, according to an embodiment of the disclosure.

In FIG. 6, an example of CSI feedback based on a plurality of DFT basis vectors for type II CSI in the 5G network is illustrated. Spatial information of a channel may be reported with a set of DFT basis vectors {b0, b1, b2, b3} 602 with L=4 selected from among candidate DFT basis vectors 601. Furthermore, amplitude information {p1, p2, p3, p4} 603 and co-phasing information {φ1, φ2, φ3, φ4} 604 maybe reported. Accordingly, in the type II CSI, a dual stage precoding matrix may be given as W=W1W2, where W1 is a matrix for selecting DFT basis vectors and W2 is a matrix for allocating amplitude and co-phasing information. Furthermore, a codebook may be represented with candidate amplitudes and phase coefficients, and a superset of candidate DFT basis vectors 601. In this case, the reported PMI may include indicators of codebook elements that may indicate an estimated channel.

In an embodiment of the disclosure, the amplitude and phase information may be reported such that a linear combination of base vectors determined according to the following equation 1 is matched to the eigenvector direction of the channel.

$$b = \sum_{i=0}^{L-1} e^{2\pi\phi_i} p_i b_i \quad \text{[Equation 1]}$$

For example, in a case of channel matrix H having the (s, u)-th element hs,u that represents a channel gain between the s-th transmit antenna and the u-th receive antenna, eigenvectors of a covariance matrix HHH may be considered. When el indicates one of the eigenvectors, PMI may be selected by the UE to maximize the value of $$\|e_i^H b\|.$$

Figure 7A:
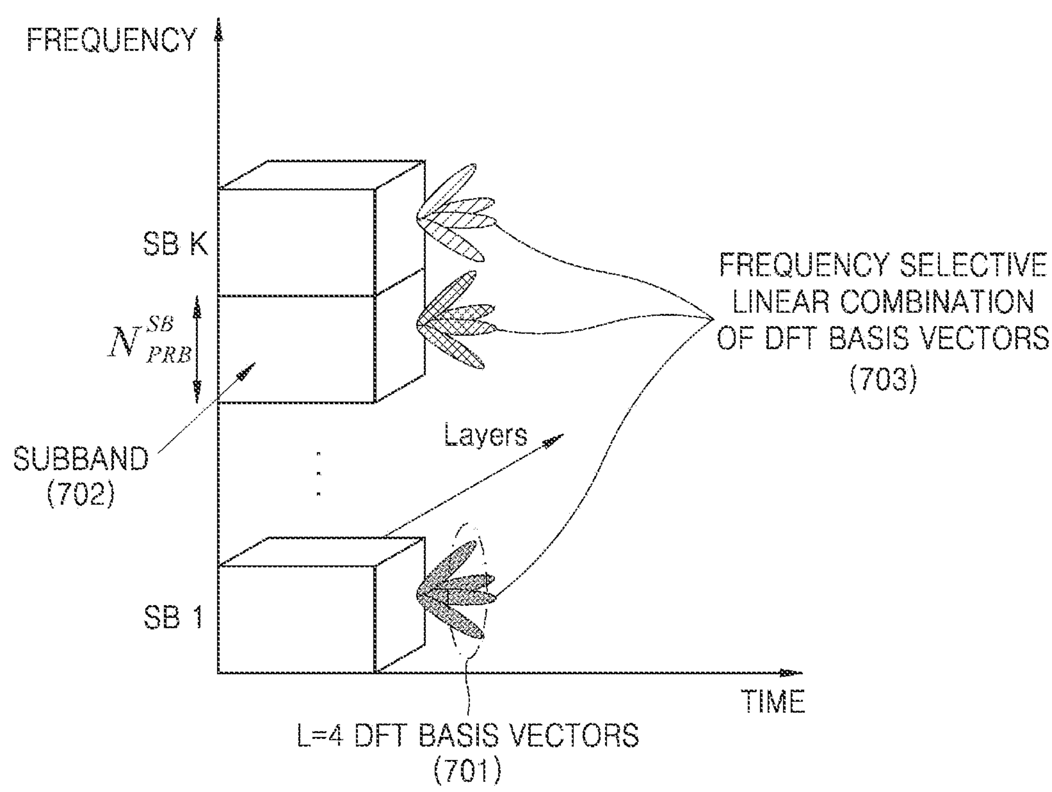
FIG. 7A illustrates a diagram for describing a report pre-coding matrix on a subband basis, according to an embodiment of the disclosure.

FIG. 7A illustrates a diagram for describing a report pre-coding matrix in a subband 702 manner, according to an embodiment of the disclosure.

In an embodiment of the disclosure, the UE may be configured in various methods to report the DFT basis vectors, amplitude coefficients and phase coefficients in a polarization-common or polarization-specific method. Referring to the 5G NR standard, for example, the DFT basis vectors may be reported in the polarization-common method, and the phase coefficients and amplitude coefficients may be reported in the polarization-specific method, i.e., for each polarized ray. The MIMO systems may allow spatial multiplexing, i.e., data transmission in multiple transmission layers. In this sense, the type II CSI in 5G NR may allow the DFT basis vectors to be reported in layer-common method, i.e., in common to all layers but the phase and amplitude coefficients to be reported in layer-specific method.

To handle frequency selectivity of broadband channels, various components of the pre-coding matrix. I.e., components of the PMI, may be reported for each frequency range in an embodiment of the disclosure. In an embodiment of the disclosure, a frequency band for CSI reporting of the UE may be divided into a set of subbands 702, and the amplitude coefficient or the phase coefficient may be reported for each of the divided subbands 702. A DL bandwidth part (BWP) in particular may be divided into the subbands 702 of physical resource blocks (PRBs) of size $$N_{PRB}^{SB}.$$

In this case, selected DFT basis vectors 701 may be linearly combined with different weights, and a vector 703 produced by the linear combination may be arranged in an eigenvector of a channel in the corresponding subband 702. Let a set of subcarriers of the k-th subband be Fk, eigenvectors of an average covariance matrix Ck may be considered. The average covariance matrix Ck may be expressed in the following equation 2:

$$C_k = \frac{1}{|F_k|} = \sum_{f \in F_k} \left((H_{f,k})^H (H_{f,k})\right) \quad \text{[Equation 2]}$$

where $f \in F_k$ are subcarriers of the k-th subband, and $H_{f,k}$ is a corresponding channel matrix.

Referring to FIG. 7A, shown is an example of the frequency selective linear combination 703 of the DFT basis vectors 701 for K subbands 702 of size $$N_{PRB}^{SB}.$$

Figure 7B:
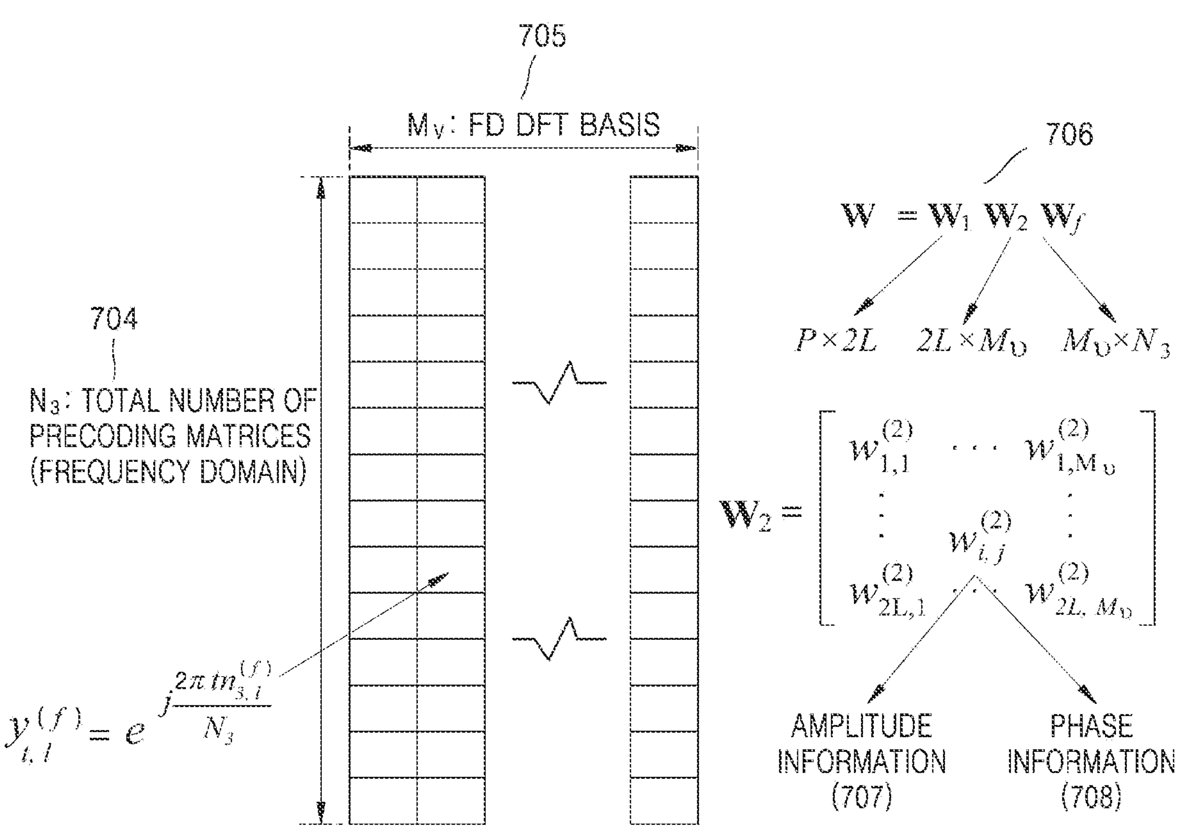
FIG. 7B illustrates a diagram for describing a pre-coding matrix configuration for an enhanced type II CSI, according to an embodiment of the disclosure.

FIG. 7B illustrates a diagram for describing a precoding matrix configuration for an enhanced type II CSI, according to an embodiment of the disclosure.

In the 5G NR standard, another configuration known as enhanced type II CSI (eType II CSI) allows amplitude coefficients and phase coefficients to be reported in the delay domain rather than in the frequency domain for each subband. This configuration may reduce feedback overhead because delay components are usually much smaller in number than the equivalent number of subbands. Referring to FIG. 7B, in an enhanced type II codebook (eType II CB), the precoding matrix is reported in the delay domain by applying the frequency domain DFT rather than in the frequency domain through Type II CSI (reported for each subband or each broadband).

Referring to FIG. 7B, an illustrative configuration of eType II CSI is shown. Especially, the precoding matrix may be represented in three steps as in $$W = W_1 W_2 W_f^H$$

706. A spatial domain selection matrix W1 selects L DFT vectors from P=2N1N2 CSI-RS ports and has 2L rows of cross polarized antennas. Furthermore, $M_v \times N_3$ the matrix $$W_f^H$$

corresponds to Mv DFT basis vectors that may transform the precoding matrix reported in the delay domain for Mv delay components to N3 frequency domain points (bins). Especially, the $t \in \{1, 2, \ldots, N_3\}$-th element of the f-th vector may be given by the following equation 3:

$$y_{t,l}^{(f)} = e^{j\frac{2\pi m_{3,l}^{(f)}}{N_3}} \quad \text{[Equation 3]}$$

Finally, the matrix W2 carries amplitude information and phase information, where i-th and j-th element wi,j carries amplitude information 707 and phase information 708 of the i-th 2D DFT beam and the j-th delay component.

To further reduce CSI overhead, the system may use angle delay reciprocity and measure a dominant angle and delay components of the channel from a UL RS such as a sounding reference signal (SRS). In this case, a precoded CSI-RS may be considered for DL CSI measurement, and CSI-RS ports may be mapped to the angle delay components of the channel. Furthermore, delay pre-compensation may be applied to the CSI ports, allowing the UE to be able to measure CSI for a smaller number of delay components, i.e., for an extreme case such as a single delay component.

Figure 8:
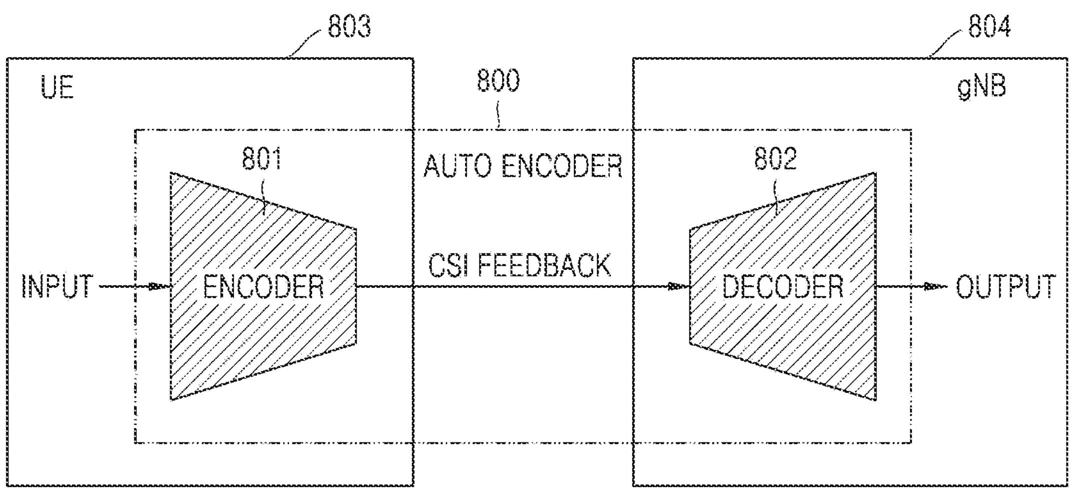
FIG. 8 illustrates a diagram for describing autoencoder (AE) based CSI feedback, according to an embodiment of the disclosure.

FIG. 8 illustrates a diagram for describing CSI feedback based on an AE 800, according to an embodiment of the disclosure.

In a wireless communication system according to an embodiment of the disclosure, artificial intelligence (AI) based CSI feedback or AE based CSI feedback may be applied. For example, referring to FIG. 8, the AE 800 may produce compressed CSI feedback through an encoder 801 on the side of a UE 803, and may reconstruct CSI feedback through a decoder 802 on the side of the gNB 804. An optimal expression of the CSI may be found by CSI feedback based on the AE 800 in terms of feedback overhead. In the CSI feedback operation based on the AE 800, compressed CSI feedback is transmitted to the BS 804 from the UE 803, thereby reducing the CSI feedback overhead.

The beyond-LTE communication systems may utilize support for a service that may freely reflect various requirements of the user and the service provider. Services considered for the beyond-5G communication system may include enhanced mobile broad band (eMBB), massive machine type communication (mMTC), ultra-reliability low latency communication (URLLC), etc. Beam management or support for various frequency bands are used to satisfy various services. In this case, there may be a different channel condition for each frequency band or beam, and a lot of resources may be consumed in the process of the UE 803 estimating and reporting a channel state to the BS 804. Hence, to reduce the resource consumption in the process of the CSI feedback, a CSI compression technology, a method by which to compress CSI and transmit the compressed CSI, may be used.

CSI reconstructed by codebook-based CSI feedback may cause information loss in the process of transferring an estimated channel H due to quantization issue of the codebook. For example, when the BS 804 transmits an RS to the UE 803, the UE 803 may estimate a channel state (channel estimation) based on the received RS to obtain channel $\hat{H}$, and obtain a relation of $\hat{H}$=UDVH in a method such as eigen value decomposition (EVD) or a singular value decomposition. The channel $\hat{H}$ may be obtained when a value of V is known from the obtained relation, so the UE 803 transmits, to the BS 804, a PMI, an index of the most similar codebook to the value of V in the codebook-based CSI feedback. In the case of transmitting, to the BS, the index of the similar codebook to the value of V instead of the value of V, there may be an error due to a difference between the preset codebook and an actual value of V. Furthermore, when the codebook is configured more variously to reduce the information loss due to the difference between the preset codebook and the actual value of V, the amount of data to be transmitted may increase accordingly.

In a case of CSI feedback based on a CSI compression technology in an embodiment of the disclosure, the UE (a transmitting end) 803 may compress the CSI data (V data) through the encoder 801 and transmit the compressed CSI data, and the BS 804 may decode or reconstruct the received compressed CSI data (z data) through the decoder 802 to obtain reconstructed CSI data ($\tilde{V}$ data).

In an embodiment of the disclosure, the AE 800 for CSI compression includes the encoder 801 on the side of the UE 803 and the decoder 802 on the side of the BS 804. The encoder 801 and the decoder 802 may each include an AI model. For example, an encoder AI model included in the encoder 801 may be used for compressing CSI data (V data) to generate compressed data (feedback data or z data). A decoder AI model included in the decoder 802 may be used for decoding or reconstructing the compressed data received from the UE 803 to generate reconstructed CSI data ($\tilde{V}$ data).

The AI model has performance that deteriorates when the task or the characteristics of input data change from a trained dataset and an environment. When the performance of the AI model deteriorates, the AI model may be replaced by another AI model that suits the characteristics of the input data or the environment, the AI model may be retrained, or fine tuning may be performed on some layers of the AI model.

The fine tuning of the AI model may refer to an operation of further retraining the AI model according to a change in characteristics of the dataset or the environment in deployment of the AI model. For example, the fine tuning may include operation of further training the AI model by using a smallest number of weights for a downstream task in addition to all the weights used for pre-training of the AI model. The downstream task may refer to a task to be finally fulfilled through the AI model.

To decode the compressed data (z data) generated by compressing (encoding) the data before compression (V data), the data before compression (V data) is obtained. Hence, the fine tuning of the AI model in an embodiment of the disclosure may be performed in a way that compares the reconstructed CSI data ($\tilde{V}$ data) obtained by decoding the compressed data (z data) with the CSI data before compression (V data).

Data input to the AE 800 may have various formats. In an embodiment of the disclosure, an input to the AE 800 may be eigenvectors corresponding to channels. A covariance matrix of $N_t \times N_r$ channel matrix H given as HHH may be calculated by the UE 803. Dominant eigenvectors of the covariance matrix eig($H^H$H)=VΣΛ given as V=[vl . . . vr] may be considered as an input to the AE 800. This is illustrated in FIG. 9.

Figure 9:
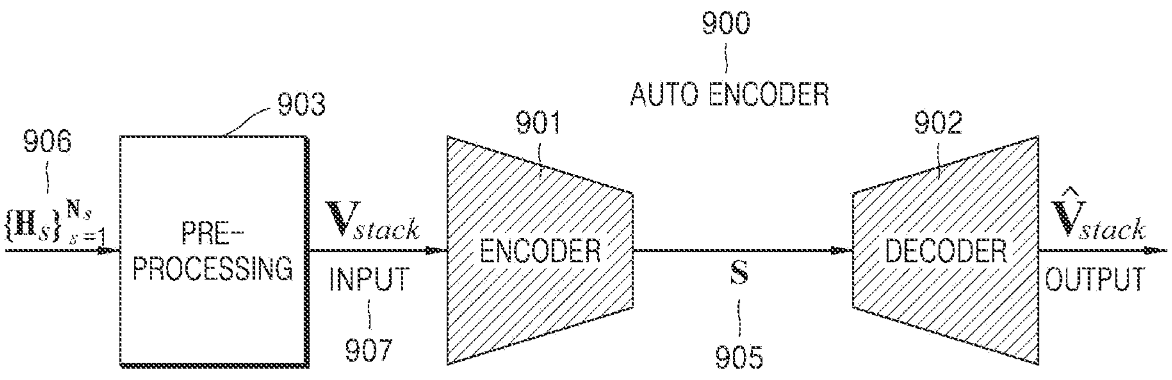
FIG. 9 illustrates a diagram for describing an operation of a pre-processor transforming an estimated channel to stacked eigenvectors in AE based CSI feedback, according to an embodiment of the disclosure.

FIG. 9 illustrates a diagram for describing an operation of a pre-processor 903 transforming an estimated channel to stacked eigenvectors in CSI feedback based on an AE 900, according to an embodiment of the disclosure.

The AE 900 of FIG. 9 may correspond to the aforementioned AE 800 of FIG. 8. An encoder 901 and a decoder 902 of FIG. 9 may correspond to the aforementioned encoder 801 and decoder 802 of FIG. 8, respectively.

Referring to FIG. 9, CSI feedback may be pre-processed by a pre-processor 903 before inputting to the AE 900. For example, a set $$\{H_s\}_{s=1}^{N_s}$$

of Ns channel matrices belonging to Ns subbands may be an input 906 to the pre-processor 903 without being input directly to the encoder 901 of the AE 900. The pre-processor 903 may perform an operation on Ns eigenvectors, and configure a matrix Vstack such that the eigenvectors correspond to one column. The output Vstack of the pre-processor 903 may be an input 907 to the encoder 901. The encoder 901 may compress the input 907 to produce a bitstream s 905 for CSI feedback. The decoder 902 included in the AE 900 may obtain the compressed CSI feedback 905 from the encoder 901, and reconstruct the stacked eigenvector Vstack by decoding the compressed CSI feedback 905. The decoder 902 may be included on the BS side, and the BS may use the reconstructed stacked eigenvectors $\hat{V}$stack as a precoder.

In the meantime, the CSI feedback operation based on the AE 900 has a limit to generalize various channel scenarios such as indoors, outdoors, urban macro (UMa), urban micro (UMi), etc. This limit may occur because various scenarios involve various levels of richness in terms of channel scattering. Another factor may be a difference in domain to be considered by the AE 900 while CSI data is being compressed. For example, when the number of subbands is Ns and the number of CSI-RS ports is $N_t$, an input to the AE 900 may be $N_S \times N_t$.

TABLE 1

| | Outdoor dataset for inference | Indoor dataset for inference |
|---|---|---|
| AE trained with outdoor dataset | 0.9105 | 0.8240 |
| AE trained with mixed dataset (50% indoor, 50% outdoor) | 0.8554 | 0.8401 |

Table 1 represents illustrative results of graded cosine similarity (GCS) between output eigenvectors $\hat{V}$S 908 and the input 907, vs, for the s-th subband. The cosine similarity between eigenvectors may be determined according to the following equation 4:

$$GCS = \frac{1}{N_s}\sum_{s=1}^{N_s}\frac{\|v_s^H \hat{v}_s^H\|}{\|v_s\|\|\hat{v}_s\|} \quad \text{[Equation 4]}$$

The AE 900 for compressing the CSI feedback includes an AI model at each end of the encoder 901 and the decoder 902. The AI model uses a dataset to train the model. Referring to Table 1, it is seen that the AE 900 trained with an outdoor dataset may have a high accuracy of about 91% when applied to an outdoor dataset and a low accuracy of about 82% when applied to an indoor dataset. To enhance performance of the AE 900 for various scenarios, a method of training the AE 900 with a combined dataset including 50% of outdoor data and 50% of indoor data may be considered. It may be seen that the AE 900 trained with the combined datasets has an enhanced inter-scenario accuracy but has a reduced in-scenario inference performance as compared to training for one scenario.

In an embodiment of the disclosure, the generalization issue in the AE based CSI compression may be relieved by the UE transmitting side information to the BS.

Figure 10:
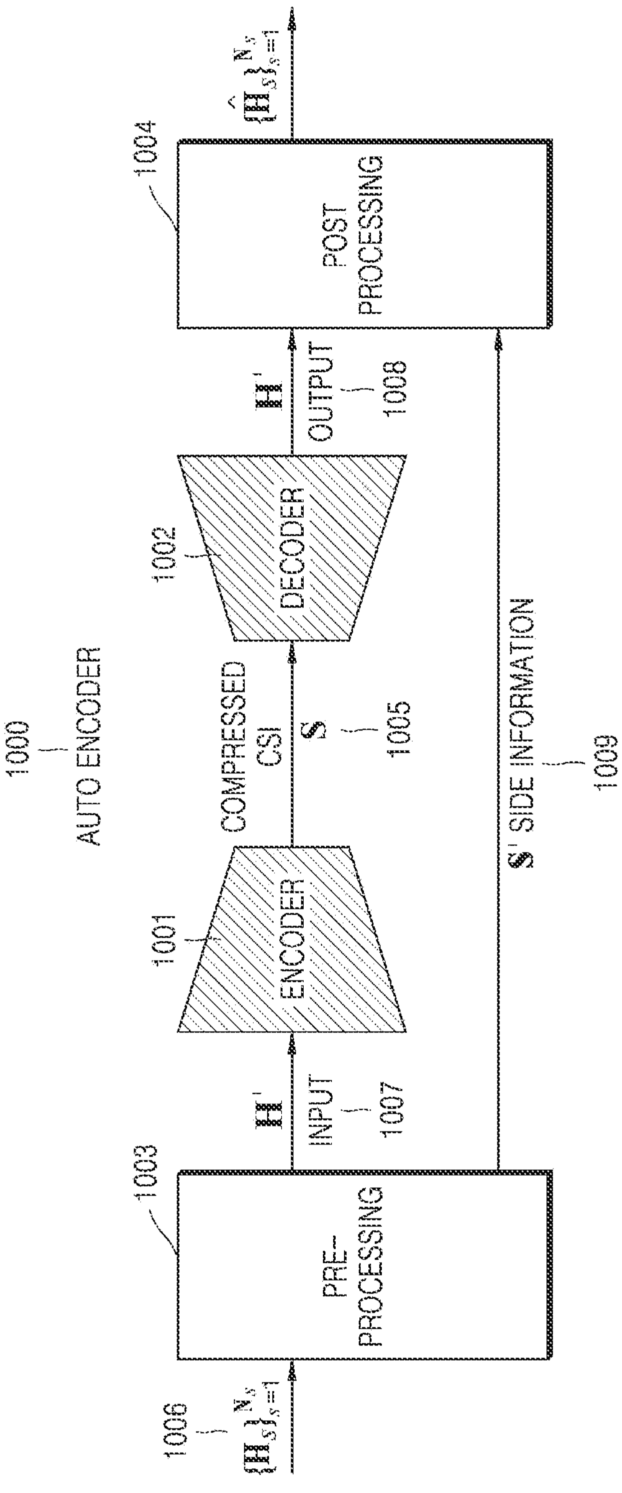
FIG. 10 illustrates a diagram for describing an operation of a UE transmitting compressed CSI and side information to a BS, according to an embodiment of the disclosure.

FIG. 10 illustrates a diagram for describing an operation of a UE transmitting compressed CSI 1005 and side information 1009 to a BS, according to an embodiment of the disclosure.

An AE 1000 of FIG. 10 may correspond to the aforementioned AE 800 of FIG. 8 or the AE 900 of FIG. 9. An encoder 1001 of FIG. 10 may correspond to the encoder 801 of FIG. 8 or the encoder 901 of FIG. 9, and a decoder 1002 of FIG. 10 may correspond to the decoder 802 of FIG. 8 or the decoder 902 of FIG. 9. Furthermore, a pre-processor 1003 of FIG. 10 may correspond to the pre-processor 903 of FIG. 9.

On receiving a CSI report request message (e.g., configuration message) from the BS, the UE may transmit information for CSI reporting to the BS. The CSI report request message transmitted by the BS to the UE may include configuration information about AE based CSI reporting. Information transmitted by the UE to the BS may include the compressed CSI 1005, and the side information 1009 used to decompress or reconstruct the compressed CSI 1005.

In an embodiment of the disclosure, the CSI configuration information may be configured in the UE, in which case the BS may obtain CSI configuration information from the UE.

Referring to FIG. 10, the UE transmits the compressed CSI s 1005 and the side information s' 1009 to the BS. The compressed CSI s 1005 and the side information s' 1009 may make up CSI feedback information.

In an embodiment of the disclosure, the pre-processor 1003 may perform dimensionality reduction of input information 1006.

For example, the pre-processor 1003 may identify L 2D DFT beams, and convert a frequency domain channel $$\{H_s\}_{s=1}^{N_s}$$

in Nt X Ns dimension to a delay domain channel $$\{\tilde{H}_s\}_{s=1}^{N_s}$$

in 2L X My dimension. In this case, 2L is equal to or smaller than Nt, and My is equal to or smaller than Ns. The UE may feedback indexes of L 2D DFT beams as part of the side information s'.

Table 2 below represents an example of the side information s'.

TABLE 2

| No. | Component of side information | Notation of indicator | Bit width | Note (assumptions) |
|---|---|---|---|---|
| 1 | Number of 2D DFT basis vectors (L) | $i_{s,1,1}$ | $\lceil \log_2(N_L) \rceil$ | $N_L$ is configured by gNB, e.g., by RRC |
| 2 | Indices of L 2D DFT vectors | $i_{s,1,2}$ | $\left\lceil \log_2\binom{2N_1O_1N_2O_2}{L} \right\rceil$ | L can be indicated by UE via $i_{s,1,2}$ or configured by gNB as part, e.g., RRC |
| 3 | Number of delay components ($M_v$) | $i_{s,2,1}$ | $\lceil \log_2(N_{M_v}) \rceil$ | $N_{M_v}$ is configured by gNB, e.g., by RRC |
| 4 | Indices of the delay components | $i_{s,2,2}$ | $Alt1: \left\lceil \log_2\binom{N_3}{M_v} \right\rceil$ $Alt2: \lceil \log_2(N_3) \rceil$ | Alt1: indices of the $M_v$ delay components are chosen combinatorically Alt2: $i_{s,2,2}$ indicates the starting delay components. |

Referring to able 2, the number of 2D DF basis vectors, L, may be represented with indicator is, 1,1. The indicator is, 1,1 may indicate the number of 2D DFT vectors configured by the BS from a maximum NL. The configuration by the BS may be e.g., performed by radio resource control (RRC) as part of the CSI configuration.

Table 3 below represents illustrative higher layer variables in a CSI feedback method based on the AE 1000.

TABLE 3

```
CodebookConfig ::= SEQUENCE {
codebookType CHOICE {
.
.
AI-CSI1 SEQUENCE {
maxNumberOfDFT-Beams BIT STRING (SIZE (3)) OPTIONAL
maxNumberOfDelayComponents BIT STRING (SIZE (5)) OPTIONAL
paramCombination-rXX INTEGER (1..8)
.
.
```

Referring to Table 3, the CSI feedback based on the AE 1000 may be configured as part of a codebook. The maximum number NL of 2D DFT beams may be represented by maxNumberOfDFT-Beams. A maximum number $N_{M_v}$ of delay components may be represented by maxNumberOfDelayComponents, which may be configured by the BS. The UE may then represent the number L of DFT beams and the number Mv of delay components may be represented by indicators is, 1,1 and is, 2,1, respectively, as part of CSI feedback.

For example, parameters L and My may be configured by the BS as part of paramCombination. In this case, the UE may add at least one of index is, 1,2 or is, 2,2 as part of the side information s' 1009 to be transmitted to the BS.

When L and My are determined by RRC configuration or determined as part of the CSI report of the UE, an indicator (index) of L DFT beams and My delay components may be reported to the BS in the side information s' 1009.

Figure 11:
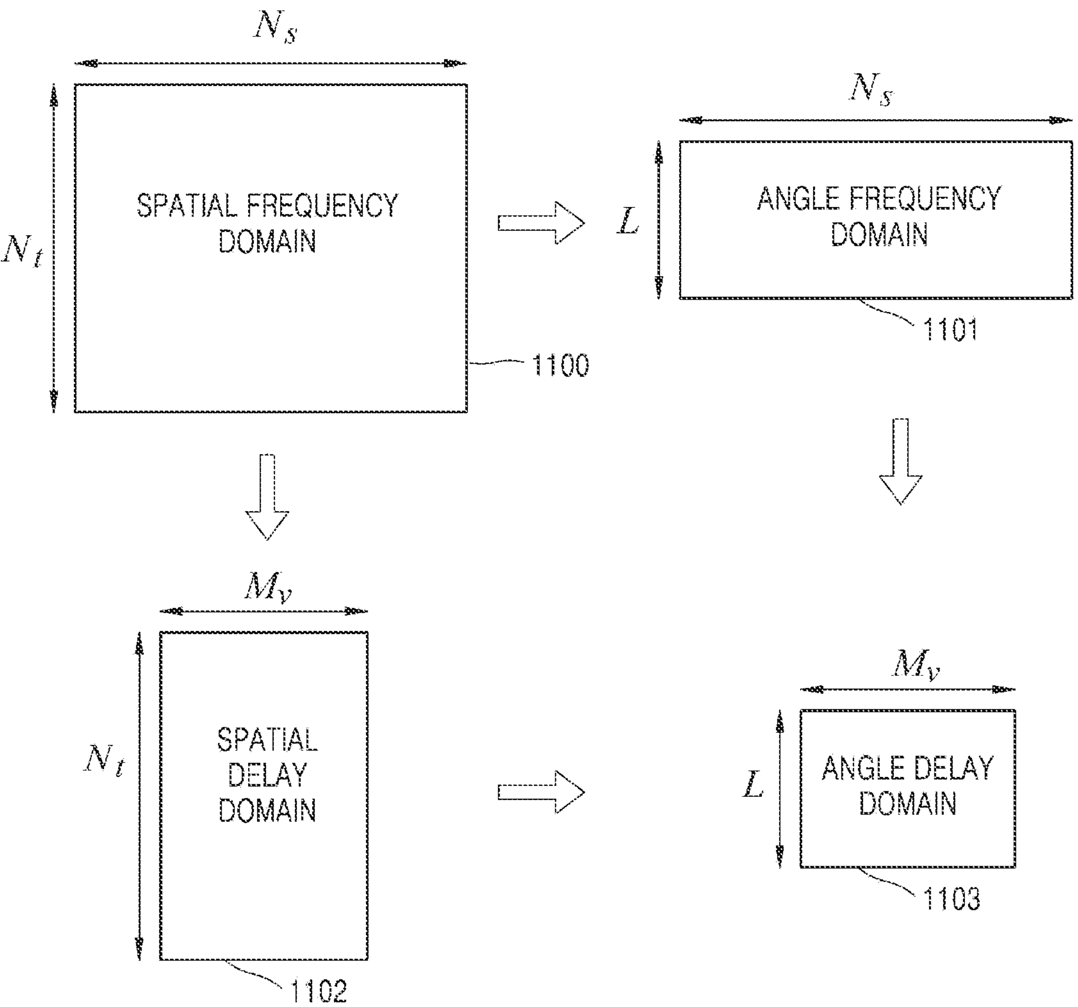
FIG. 11 illustrates a diagram for describing a pre-processing operation, according to an embodiment of the disclosure.

FIG. 11 illustrates a diagram for describing a pre-processing operation, according to an embodiment of the disclosure.

A pre-processing operation of FIG. 11 may be performed by the pre-processor 903 of FIG. 9 or the pre-processor 1003 of FIG. 10.

Referring to FIG. 11, the AE may consider various domains (dimensions) for CSI compression. For example, the AE may perform CSI compression on a non-pre-processed spatial frequency domain 1100. In this case, a data domain for performing compression, i.e., an input to the AE, has a dimension Nt X Ns.

For example, the spatial frequency domain 1100 may be pre-processed into an angle frequency domain 1101. In other words, the pre-processor may convert data into the angle frequency domain 1101 by converting Nt samples in a spatial domain to L samples in the angle domain. In this case, data input to the AE after the pre-processing operation is reduced to the dimension of L X Ns.

For example, the spatial frequency domain 1100 may be pre-processed into a spatial delay domain 1102. In other words, the pre-processor may convert data into the spatial delay domain 1102 by converting Ns samples (subbands) in the frequency domain to My samples in the delay domain. In this case, data input to the AE after the pre-processing operation is reduced to the dimension of Nt X Mv.

For example, the spatial frequency domain 1100 may be pre-processed into an angle delay domain 1103. In other words, the pre-processor may convert data into the angle delay domain 1103 by converting Nt samples in the spatial domain to L samples in the angle domain and converting Ns samples (subbands) in the frequency domain to Mv samples in the delay domain. In this case, data input to the AE after the pre-processing operation is reduced to the dimension of L X Mv.

As such, when pre-processing for reducing the data dimension of a data signal before the data signal is input to the AE is performed in a method that identifies a particular angle and particular delay component (e.g, when data to be compressed is selected from among the whole CSI feedback data), the dimension of target data to be compressed is reduced through an AI model, reducing the number of times of performing compression by the AE and thus reducing sensitivity of the AE for various environments and scenarios.

Table 4 below represents the dimension of data input to the AE after the pre-processing operation and corresponding information included in the side information s'.

TABLE 4

| No. | Domain of compression by AI-based CSI | Dimension of compression (input to the autoencoder per polarization) | Possible content of side information |
|---|---|---|---|
| 1 | Spatial-frequency | $N_t$ X $N_s$ | — |
| 2 | Angle-frequency | L X $N_s$ | $i_{s, 1, 1}$, $i_{s, 1, 2}$ |
| 3 | Space-delay | $N_t$ X $M_v$ | $i_{s, 2, 1}$, $i_{s, 2, 2}$ |
| 4 | Angle-delay | L X $M_v$ | $i_{s, 1, 1}$, $i_{s, 1, 2}$, $i_{s, 2, 1}$, $i_{s, 2, 2}$ |

Figure 12:
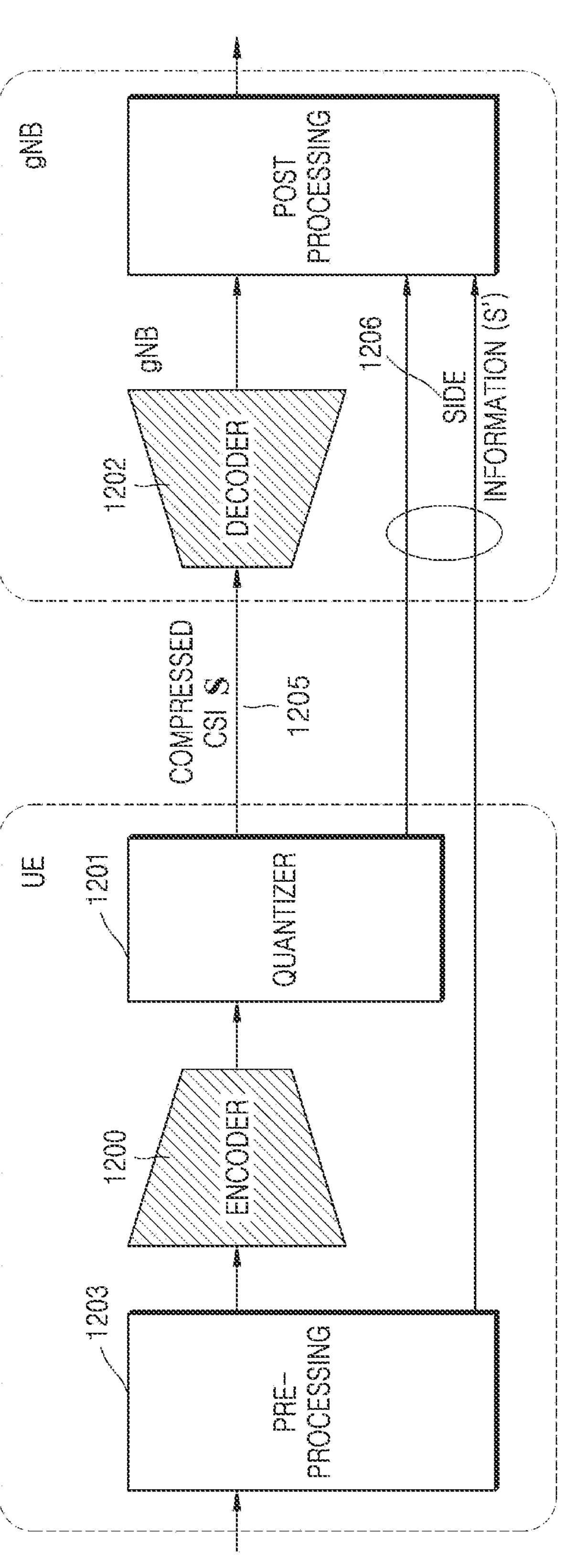
FIG. 12 illustrates a diagram for describing an operation of a UE transmitting side information including quantization information to a BS, according to an embodiment of the disclosure.

FIG. 12 illustrates a diagram for describing an operation of a UE transmitting side information s' 1206 including quantization information to a gNB, according to an embodiment of the disclosure.

Referring to FIG. 12, in an embodiment of the disclosure, the UE may include a quantizer 1201. The quantizer 1201 may be configured in an encoder 1200 or may be implemented as a separate component. The UE may quantize CSI compressed by the encoder 1200 before transmitting the compressed CSI to the gNB. The quantizer 1201 included in the UE may quantize the compressed CSI output from the encoder 1200. In an embodiment of the disclosure, the UE may transmit quantized compressed CSI S 1205 to the gNB. The quantized compressed CSI S 1205 may be transmitted to the gNB as CSI feedback. In the case that the quantized compressed CSI S 1205 is transmitted to the gNB from the UE, the side information S' 1206 may include information about the quantizer 1201, and may be transmitted to the gNB together with or separately from the quantized compressed CSI bit S 1205.

In an embodiment of the disclosure, the side information S' 1206 determined from the information about the quantizer 1201 may include information about e.g., the number of bits for each dimension of the encoder 1200, the total number of bits of the quantized compressed CSI S 1205, etc. For example, the side information S' 1206 determined from the information about the quantizer 1201 may include information about a rule used by the quantizer 1201 to quantize the compressed CSI output from the encoder 1200 or other various information allowing the gNB to reversely convert and reconstruct the quantized data. On receiving the side information S' 1206 from the UE, the gNB may configure a decoder 1202 or a post-processor to reconstruct the received quantized compressed CSI S 1205 based on the side information S' 1206.

Referring to FIG. 12, the UE may include a pre-processor 1203 and the quantizer 1201. In this case, the UE may perform the pre-processing operation as described above in connection with FIG. 11 on CSI feedback data, compress the pre-processed CSI feedback data through the encoder 1200, and produce the quantized compressed CSI feedback data S 1205 by quantizing the compressed CSI feedback data through the quantizer 1201. In the case that the CSI feedback to be transmitted by the UE to the gNB corresponds to data pre-processed, compressed and quantized, additional data to be transmitted by the UE to the gNB may be configured with information from one of the pre-processor 1203 or the quantizer 1201.

The encoder 1200 of FIG. 12 may correspond to the encoder 801 of FIG. 8, the encoder 901 o FIG. 9, or the encoder 1001 of FIG. 10, and the decoder 1202 of FIG. 12 may correspond to the decoder 802 of FIG. 8, the decoder of FIG. 9 or the decoder 1002 of FIG. 10. Furthermore, the pre-processor 1203 of FIG. 12 may correspond to the pre-processor 903 of FIG. 9 or the pre-processor 1003 of FIG. 10, and the post-processor of FIG. 12 may correspond to the post-processor 1004 of FIG. 10.

Referring to FIG. 12, shown is a case that the CSI feedback transmitted by the UE to the gNB is data pre-processed, compressed and quantized, but in an embodiment of the disclosure, the CSI feedback transmitted by the UE to the gNB may also be non-pre-processed data compressed and quantized. In this case, additional data transmitted by the UE to the gNB may be configured with information from the quantizer 1201.

Figure 13:
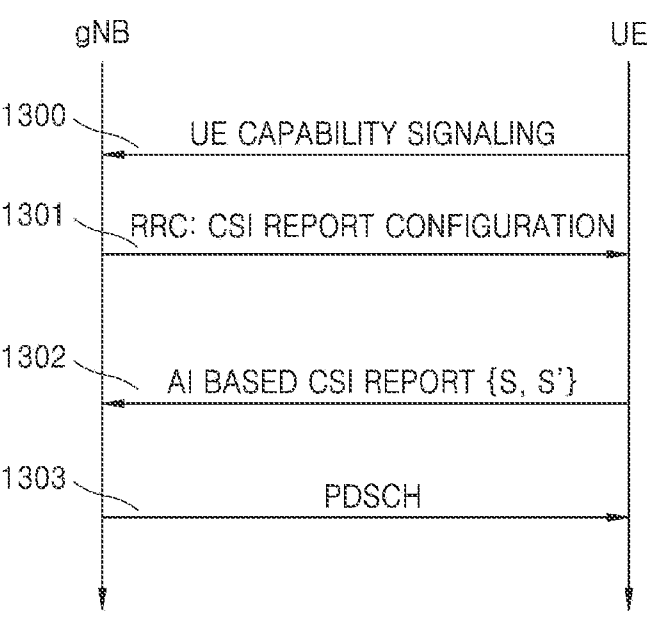
FIG. 13 illustrates a diagram for describing signaling between a UE and a BS for AE based CSI feedback, according to an embodiment of the disclosure.

FIG. 13 illustrates a diagram for describing signaling between a UE and a gNB for AE based CSI feedback, according to an embodiment of the disclosure.

The UE of FIG. 13 may correspond to the aforementioned UE shown in FIG. 1, FIG. 3A, FIG. 8 or FIG. 12, and the gNB of FIG. 13 may correspond to the aforementioned BS or gNB of FIG. 1, FIG. 3B, FIG. 8 or FIG. 12.

Referring to FIG. 13, in operation 1300, the UE may transmit information about the UEs ability to perform AI based CSI feedback to the gNB. For example, the UE may transmit information indicating that the UE is capable of performing AI based CSI feedback to the gNB through UE capability signaling.

In an embodiment of the disclosure, the UE capability signaling may include at least one of information about a rule for the pre-processor included in the UE to perform pre-processing on data or information about a rule for the quantizer included in the UE to perform quantization on the data. For example, the operation of the pre-processor included in the UE performing pre-processing on data may correspond to what is described above in connection with FIG. 11, and the operation of the quantizer included in the UE performing quantization on the data may correspond to what is described above in connection with FIG. 12.

Subsequently, in operation 1301, the gNB may transmit CSI report configuration information to the UE through RRC signaling. The CSI report configuration information may include at least one of information relating to the pre-processor included in the UE, information relating to an AI model of an AE, or information relating to the quantizer. Furthermore, the CSI report configuration information may include information about a size of the compressed CSI S or the side information S', or a reporting format.

In operation 1302, the UE may receive the CSI report configuration information from the gNB and transmit AE based CSI feedback including the compressed CSI S and the side information S'. In an embodiment of the disclosure, the compressed CSI S transmitted by the UE to the gNB may be CSI feedback data compressed without being pre-processed, CSI feedback data pre-processed by the pre-processor and then compressed by the encoder, CSI feedback data compressed by the encoder without being pre-processed and then quantized by the quantizer, or CSI feedback data pre-processed by the pre-processor, compressed by the encoder and quantized by the quantizer. Furthermore, the side information S' transmitted by the UE to the gNB may include at least one of information about a data compression rule of the encoder, information about a data pre-processing rule of the pre-processor, or information about a data quantization rule of the quantizer.

In an embodiment of the disclosure, the gNB and the UE may share the data compression rule of the encoder, the data pre-processing rule of the pre-processor, or the data quantization rule of the quantizer in advance. In this case, the side information S' may include a minimum of parameters to execute the rules.

In an embodiment of the disclosure, the gNB may not know the information about the encoder, the pre-processor or the quantizer included in the UE. In this case, the side information S' transmitted by the UE to the gNB may include a parameter for implementing a particular rule along with at least one of the data compression rule of the encoder, the data pre-processing rule of the pre-processor, or the data quantization rule of the quantizer.

In an embodiment of the disclosure, the gNB and the UE may not share exact information about the data compression rule of the encoder, the data pre-processing rule of the pre-processor, or the data quantization rule of the quantizer in advance, but may share various rules as candidates. In this case, the side information S' may include an indicator to indicate a rule actually applied among the candidate rules and a parameter for implementing the rule.

In operation 1302, on receiving the compressed CSI feedback S and the side information S' from the UE, the gNB may reconstruct the CSI feedback through the decoder and the post-processor based on the received side information S'. The CSI feedback reconstruction operation may be implemented by performing the operations performed by the UE in reverse order, based on the compressed CSI feedback S and the side information S'. The gNB may identify CSI through the reconstructed CSI feedback.

Afterward, in operation 1303, on receiving the AE based CSI feedback, the UE may transmit DL data on a physical downlink shared channel (PDSCH) based on the identified CSI.

Figure 14A:
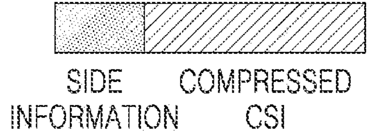
FIGS. 14A, 14B, and 14C illustrate diagrams for describing an operation of a UE transmitting side information to a BS in AE based CSI feedback, according to an embodiment of the disclosure.
Figure 14B:
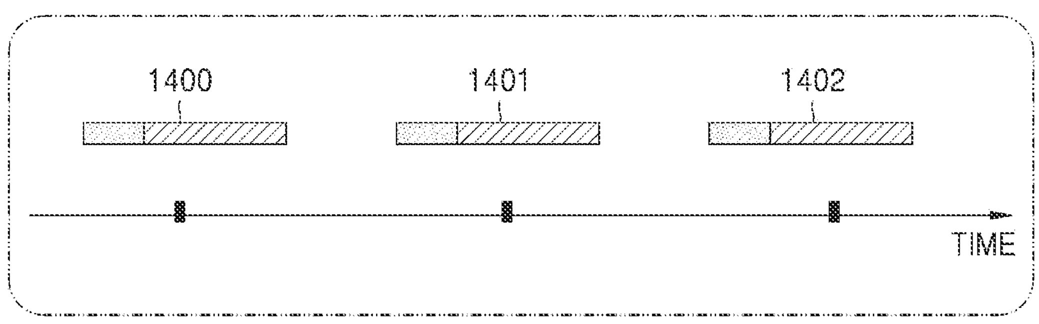
Figure 14C:
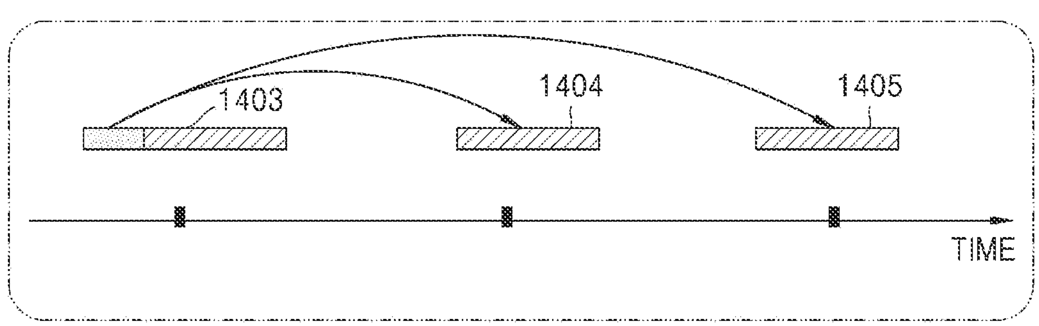

FIGS. 14A, 14B, and 14C illustrate diagrams for describing an operation of a UE transmitting side information to a BS in AE based CSI feedback, according to an embodiment of the disclosure.

In FIG. 14A, data transmitted in the time domain is shown. In an embodiment of the disclosure, CSI feedback may be periodically or non-permanently reported. In this case, the BS may set up a cycle for the UE to report the side information and the compressed CSI.

Referring to FIG. 14B, the UE may transmit the side information each time it transmits the compressed CSI feedback to BS (1400, 1401, and 1402). In this case, even in a case that the channel state is changed in time, reconstruction accuracy of the compressed CSI feedback may increase.

Referring to FIG. 14C, the UE may not transmit the side information each time it transmits the compressed CSI feedback to the BS. For example, there may be connection between channels in the time domain. Specifically, when the channel state is not significantly changed or there is little change in condition even after some time, the side information (e.g., angle-delay components) of a certain channel may remain the same in a plurality of times of CSI feedback 1403, 1404 and 1405. In this case, when the side information is transmitted to the BS in particular CSI feedback 1403, the side information may not be transmitted to the BS during a certain number of subsequent CSI feedback operations 1404 and 1405, but the side information already transmitted may be applied to the CSI feedback in which no side information is reported.

For example, in an embodiment of the disclosure as shown in FIG. 14C, the side information transmitted in the CSI feedback 1403 may include timer information for the side information. Furthermore, the UE may transmit an indicator including information about whether it is capable of performing time-correlated CSI measurement and reporting to the BS in the side information, and the BS may then provide the UE with configuration information for the time-correlated CSI measurement and reporting based on the indicator received from the UE.

Figure 15:
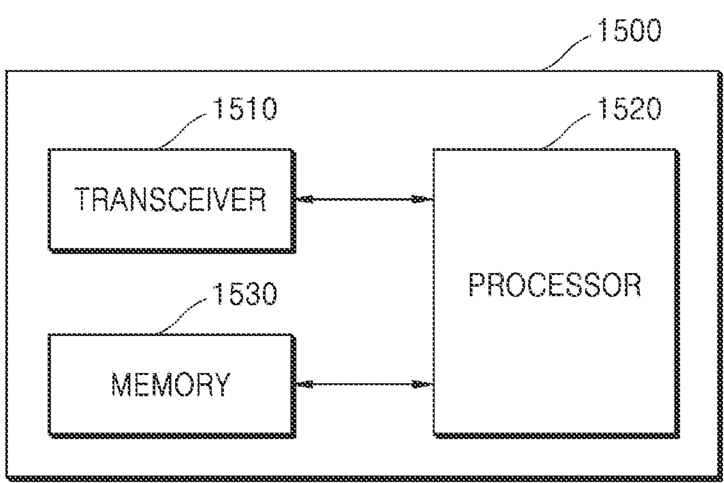
FIG. 15 illustrates a schematic block diagram of a BS, according to an embodiment of the disclosure.

FIG. 15 illustrates a schematic block diagram of a BS 1500, according to an embodiment of the disclosure.

Referring to FIG. 15, the BS 1500 may include a transceiver 1510, a processor 1520, and a memory 1530. The transceiver 1510, the processor 1520 and the memory 1530 of the BS 1500 may operate according to the aforementioned communication method of the BS 1500. Elements of the BS 1500 are not, however, limited thereto. For example, the base station 1500 may include more or fewer elements than described above. In addition, the transceiver 1510, the processor 1520, and the memory 1530 may be implemented in a single chip. The processor 1520 may include one or more processors.

A receiver and a transmitter of the BS 1500 are collectively called the transceiver 1510, which may transmit or receive signals to or from a UE or a network entity. The signals to be transmitted to or received from the UE or the network entity may include control information and data. For this, the transceiver 1510 may include an RF transmitter for up-converting the frequency of a signal to be transmitted and amplifying the signal and an RF receiver for low-noise amplifying a received signal and down-converting the frequency of the received signal. It is merely an example of the transceiver 1510, and the elements of the transceiver 1510 are not limited to the RF transmitter and RF receiver.

The transceiver 1510 may perform functions for transmitting and receiving signals on a wireless channel. For example, the transceiver 1510 may receive a signal on a wireless channel and output the signal to the processor 1520, and transmit a signal output from the processor 1520 on a wireless channel.

The memory 1530 may store a program and data used for operation of the base station 1500. Furthermore, the memory 1530 may store control information or data included in a signal obtained by the BS. The memory 1530 may include a storage medium such as a read only memory (ROM), a random-access memory (RAM), a hard disk, a compact disc ROM (CD-ROM), and a digital versatile disk (DVD), or a combination of storage mediums. Alternatively, the memory 1530 may not be separately present but integrated into the processor 1520. The memory 1530 may include a volatile memory, a non-volatile memory, or a combination of the volatile memory and the non-volatile memory. The memory 1530 may also provide the stored data at the request of the processor 1520.

The processor 1520 may control a series of processes for the BS 1500 to be operated according to the embodiments of the disclosure. For example, the processor 1520 may receive control signals and data signals through the transceiver 1510 and process the received control signals and data signals. The processor 1520 may transmit the processed control signal and data signal through the transceiver 1510. The processor 1520 may record data to the memory 1530 or read out data from the memory 1330. The processor 1520 may perform functions of a protocol stack requested by a communication standard. For this, the processor 1520 may include at least one processor or microprocessor. In an embodiment of the disclosure, part of the transceiver 1510 and the processor 1520 may be referred to as a communication processor (CP).

The processor 1520 may include one or more processors. The one or more processors may include a universal processor such as a CPU, an AP, a digital signal processor (DSP), etc., a GPU, a vision processing unit (VPU), etc., or a dedicated AI processor such as a neural processing unit (NPU). For example, when the one or more processors are the dedicated AI processors, the dedicated AI processors may be designed in a hardware structure that is specific to dealing with a particular AI model.

Figure 16:
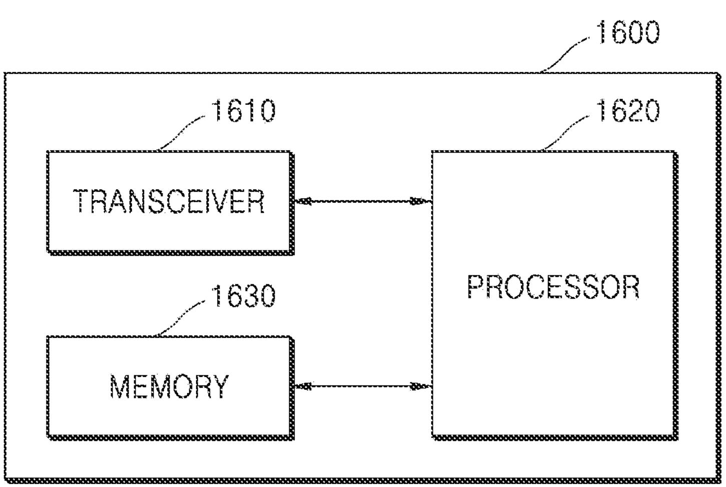
FIG. 16 illustrates a schematic block diagram of a UE, according to an embodiment of the disclosure.

FIG. 16 illustrates a schematic block diagram of a UE 1600, according to an embodiment of the disclosure.

Referring to FIG. 16, a UE 1600 may include a transceiver 1610, a processor 1620, and a memory 1630. Elements of the UE 1600 are not, however, limited thereto. For example, the UE 1600 may include more or fewer elements than those described above. In an embodiment of the disclosure, the transceiver 1610, the processor 1620, and the memory 1630 may be implemented in a single chip.

The processor 1620 may include one or more processors. The one or more processors may include a universal processor such as a CPU, an AP, a digital signal processor (DSP), etc., a GPU, a vision processing unit (VPU), etc., or a dedicated AI processor such as a neural processing unit (NPU). For example, when the one or more processors are the dedicated AI processors, the dedicated AI processors may be designed in a hardware structure that is specific to dealing with a particular AI model.

The processor 1620 may control a series of processes for the UE 1600 to be operated according to the aforementioned embodiments of the disclosure. For example, the processor 1620 may receive control signals and data signals through the transceiver 1610 and process the received control signals and data signals. The processor 1620 may transmit the processed control signal and data signal through the transceiver 1610. Furthermore, the processor 1620 may control input data derived from the received control signal and data signal to be processed according to a predefined operation rule or AI model stored in the memory 1630. The processor 1620 may record data to the memory 1630 or read out data from the memory 1430. The processor 1620 may further perform functions of a protocol stack requested by a communication standard. In an embodiment, the processor 1620 may include at least one processor. In an embodiment of the disclosure, part of the transceiver 1610 or the processor 1620 may be referred to as a CP.

The memory 1630 may store a program and data used for operation of the UE 1600. Furthermore, the memory 1630 may store control information or data included in a signal obtained by the UE 1600. Furthermore, the memory 1630 may store predefined operation rules or an AI model used by the UE 1600. The memory 1630 may include a storage medium such as a ROM, a RAM, a hard disk, a CD-ROM, and a DVD, or a combination of storage mediums. Alternatively, the memory 1630 may not be separately present but integrated into the processor 1620. The memory 1630 may include a volatile memory, a non-volatile memory, or a combination of the volatile memory and the non-volatile memory. The memory 1630 may also provide the stored data at the request of the processor 1620.

The transceiver 1610 may refer to a transmitter and a receiver, and the transceiver 1610 of the UE 1600 may transmit or receive signals to or from a BS or a network entity. The signals may include control information and data. For this, the transceiver 1610 may include an RF transmitter for up-converting the frequency of a signal to be transmitted and amplifying the signal and an RF receiver for low-noise amplifying a received signal and down-converting the frequency of the received signal. It is merely an example of the transceiver 1610, and the elements of the transceiver 1610 are not limited to the RF transmitter and RF receiver. In addition, the transceiver 1610 may receive a signal on a wireless channel and output the signal to the processor 1620, and transmit a signal output from the processor 1620 on a wireless channel.

Functions related to AI according to embodiments of the disclosure are operated through a processor and a memory. There may be one or more processors. The one or more processors may include a universal processor such as a CPU, an AP, a digital signal processor (DSP), etc., a GPU, a vision processing unit (VPU), etc., or a dedicated AI processor such as a neural processing unit (NPU). The one or more processors may control processing of input data according to a predefined operation rule or an AI model stored in the memory. When the one or more processors are the dedicated AI processors, they may be designed in a hardware structure that is specific to dealing with a particular AI model.

The predefined operation rule or the AI model may be made by learning. Specifically, the predefined operation rule or the AI model being made by learning refers to the predefined operation rule or the AI model established to perform a desired feature (or an object) being made when a basic AI model (or a deep learning model) is trained by a learning algorithm with a lot of training data. Such learning may be performed by a device itself in which AI is performed according to the disclosure, or by a separate server and/or system. Examples of the learning algorithm may include supervised learning, unsupervised learning, semi-supervised learning, or reinforcement learning, without being limited thereto.

The AI model (or deep learning model) may be made up of a plurality of neural network layers. Each of the plurality of neural network layers may have a plurality of weight values, and perform neural network operation through operation between an operation result of the previous layer and the plurality of weight values. The plurality of weight values owned by the plurality of neural network layers may be optimized by learning results of the AI model. For example, the plurality of weight values may be updated to reduce or minimize a loss value or a cost value obtained by the AI model during a training procedure. An artificial neural network may include a deep neural network (DNN), for example, a convolutional neural network (CNN), a recurrent neural network (RNN), a restricted Boltzmann machine (RBM), a deep belief network (DBN), a bidirectional recurrent deep neural network (BRDNN), or a deep Q-network, without being limited thereto.

Various embodiments of the disclosure may be implemented or supported by one or more computer programs, which are formed of computer-readable program codes and may be embodied on a computer-readable medium. Throughout the specification, the terms 'application' and 'program' may refer to one or more computer programs, software components, instruction sets, procedures, functions, objects, classes, instances, associated data, or part thereof, suitably implemented in computer-readable program codes. The computer-readable program codes may include various types of computer codes including source codes, target codes and executable codes. The computer-readable medium may include various types of medium accessible by a computer, such as a ROM, RAM, a hard disk drive (HDD), a compact disc (CD), a digital video disc (DVD) or other various types of memory.

The computer-readable storage medium may be provided in the form of a non-transitory storage medium. The non-transitory storage medium is a tangible device, which may exclude wired, wireless, optical, or other communication links to transmit the transitory electric or other signals. The non-transitory storage medium does not discriminate between an occasion when data is semipermanently stored and an occasion when data is temporarily stored in the storage medium. For example, the non-transitory storage medium may include a buffer that temporarily stores data. The computer-readable medium may be an arbitrary available medium that may be accessed by the computer, including volatile, non-volatile, removable, and non-removable mediums. The computer-readable medium includes a medium for storing data permanently, and a medium for storing data which can be overwritten afterward, i.e., a rewritable optical disk or an erasable memory device.

In an embodiment of the disclosure, the aforementioned method according to the various embodiments of the disclosure may be provided in a computer program product. The computer program product may be a commercial product that may be traded between a seller and a buyer. The computer program product may be distributed in the form of a storage medium (e.g., a compact disc read only memory (CD-ROM)), through an application store, directly between two user devices (e.g., smart phones), or online (e.g., downloaded or uploaded). In the case of online distribution, at least part of the computer program product (e.g., a downloadable app) may be at least temporarily stored or arbitrarily created in a storage medium that may be readable to a device such as a server of the manufacturer, a server of the application store, or a relay server.

Several embodiments have been described, but a person of ordinary skill in the art will understand and appreciate that various modifications can be made without departing the scope of the disclosure. For example, the aforementioned method may be performed in a different order, and/or the aforementioned systems, structures, devices, circuits, etc., may be combined in different combinations from what is described above, or replaced or substituted by other components or equivalents thereof, to obtain appropriate results. Thus, it will be apparent to those of ordinary skill in the art that the disclosure is not limited to the embodiments described, but can encompass not only the appended claims but the equivalents. For example, an element described in the singular form may be implemented as being distributed, and elements described in a distributed form may be implemented as being combined.

The scope of the disclosure is defined by the appended claims, and it will be understood by those of ordinary skill in the art that various changes in form and details may be made without departing from the spirit and scope of the disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for a user equipment (UE) in a wireless communication system, the method comprising:

receiving channel state information (CSI) report configuration information from a base station (BS);

generating compressed CSI feedback data through an encoder comprised by the UE based on the CSI report configuration information and generating side information relating to the compressed CSI feedback data; and transmitting the compressed CSI feedback data and the side information to the BS, wherein the UE further comprises a quantizer, wherein the compressed CSI feedback data is generated by having CSI data compressed by the encoder and quantized by the quantizer, and wherein the side information includes information related to the quantizer and at least one of information about a data compression rule of the encoder, information related to DFT beams, or information related to delay components.

2. The method of claim 1, wherein the CSI report configuration information is received through radio resource control (RRC) signaling.

3. The method of claim 1, wherein the UE further comprises a pre-processor, and wherein the compressed CSI feedback data is generated by having CSI data pre-processed by the pre-processor, compressed by the encoder, and quantized by the quantizer.

4. The method of claim 3, wherein the side information further comprises information relating to the pre-processor.

5. The method of claim 3, wherein the pre-processor is configured to reduce a dimension of the CSI data and output resultant CSI data.

6. The method of claim 1, wherein the side information corresponds to a plurality of the compressed CSI feedback data and comprises a timer.

7. A user equipment (UE) for a wireless communication system, the UE comprising:

an encoder;

a quantizer;

a transceiver; and at least one processor, wherein the at least one processor is configured to:

receive channel state information (CSI) report configuration information from a base station (BS) through the transceiver;

generate compressed CSI feedback data through the encoder based on the CSI report configuration information and generate side information relating to the compressed CSI feedback data; and transmit the compressed CSI feedback data and the side information to the BS through the transceiver, wherein the compressed CSI feedback data is generated by having CSI data compressed by the encoder and quantized by the quantizer, and wherein the side information includes information related to the quantizer and at least one of information about a data compression rule of the encoder, information related to DFT beams, or information related to delay components.

8. The UE of claim 7, wherein the CSI report configuration information is received through radio resource control (RRC) signaling.

9. The UE of claim 7, further comprising a pre-processor, wherein the at least one processor is configured to generate the compressed CSI feedback data by pre-processing CSI data through the pre-processor, compressing the pre-processed CSI data through the encoder, and quantizing the compressed CSI data through the quantizer.

10. The UE of claim 9, wherein the side information further comprises information relating to the pre-processor.

11. The UE of claim 9, wherein the at least one processor is configured to pre-process the CSI data by reducing a dimension of the CSI data through the pre-processor.

12. The UE of claim 7, wherein the side information corresponds to a plurality of the compressed CSI feedback data and comprises a timer.

13. A method for a base station (BS) in a wireless communication system, the method comprising:

transmitting channel state information (CSI) report configuration information to a user equipment (UE);

receiving, from the UE, compressed CSI feedback data determined based on the CSI report configuration information and side information relating to the compressed CSI feedback data, wherein the compressed CSI feedback data is generated by having CSI data compressed by an encoder and quantized by a quantizer, and wherein the side information includes information related to the quantizer and at least one of information about a data compression rule of an encoder, information related to DFT beams, or information related to delay components;

reconstructing the compressed CSI feedback data through a decoder comprised by the BS; and post-processing the reconstructed CSI feedback data through a post-processor comprised by the BS based on the side information.

* * * * *